(12) United States Patent
Ejima et al.

(10) Patent No.: US 7,058,286 B2
(45) Date of Patent: Jun. 6, 2006

(54) INFORMATION INPUT APPARATUS

(75) Inventors: Satoshi Ejima, Setagaya-ku (JP); Akihiko Hamamura, Chiba (JP)

(73) Assignee: Nikon Corporation, Tokyo (JP)

(*) Notice: Subject to any disclaimer, the term of this patent is extended or adjusted under 35 U.S.C. 154(b) by 987 days.

(21) Appl. No.: 09/803,052

(22) Filed: Mar. 12, 2001

(65) Prior Publication Data

US 2001/0009607 A1 Jul. 26, 2001

Related U.S. Application Data

(63) Continuation of application No. 09/053,009, filed on Apr. 1, 1998, now abandoned, which is a continuation-in-part of application No. 08/831,434, filed on Apr. 1, 1997, now Pat. No. 6,229,953.

(30) Foreign Application Priority Data

| Apr. 3, 1996 | (JP) | .................................. 8-081165 |
| Apr. 3, 1996 | (JP) | .................................. 8-081167 |
| Apr. 1, 1997 | (JP) | .................................. 9-82687 |
| Apr. 3, 1997 | (JP) | .................................. 9-84770 |

(51) Int. Cl.
*H04N 5/91* (2006.01)

(52) U.S. Cl. .......................... 386/95; 386/96; 348/515; 348/423.1

(58) Field of Classification Search ................ 386/38, 386/39, 46, 54, 56, 60–62, 64–66, 69, 1, 386/4, 95, 96, 107, 117, 109; 360/13; 348/231.4, 348/423, 515; 369/48, 49; 370/394, 474, 370/503, 517

See application file for complete search history.

(56) References Cited

U.S. PATENT DOCUMENTS

| 5,241,428 | A | | 8/1993 | Goldwasser et al. |
| 5,521,927 | A | | 5/1996 | Kim et al. |
| 5,568,274 | A | | 10/1996 | Fujinami et al. |
| 5,613,032 | A | * | 3/1997 | Cruz et al. ..................... 386/69 |
| 5,614,946 | A | * | 3/1997 | Fukuoka .................. 348/231.4 |
| 5,648,760 | A | | 7/1997 | Kumar |
| 5,696,496 | A | | 12/1997 | Kumar |
| 5,815,201 | A | * | 9/1998 | Hashimoto et al. ...... 348/231.4 |
| 5,930,450 | A | | 7/1999 | Fujita |
| 5,982,981 | A | | 11/1999 | Satoh |
| 6,084,630 | A | * | 7/2000 | Yamagishi et al. ........... 386/96 |
| 6,229,953 | B1 | * | 5/2001 | Ejima et al. .................. 386/96 |

* cited by examiner

*Primary Examiner*—James J. Groody
*Assistant Examiner*—Christopher Onuaku
(74) *Attorney, Agent, or Firm*—Oliff & Berridge PLC

(57) ABSTRACT

An information processing apparatus capable of receiving and processing a variety of types of input is shown with features that make it easy to add properly synchronized information as desired. A CCD photoelectrically converts into image signals the light of objects collected by a photographic lens. The image signals of the photographic images are digitized by an analog/digital (A/D) conversion circuit, and are compressed by a digital signal processor (DSP). A central processing unit (CPU) records on a memory card the photographic images along with their input date and time as header information. When sound information is received through a microphone during reproduction of the photographic images, the CPU 34 records on the memory card the sound information along with the input date and time header information of the photographic images.

19 Claims, 17 Drawing Sheets

― 2 X 2 PIXEL AREA

| a | b | a | b | a | b | a | b |
|---|---|---|---|---|---|---|---|
| c | d | c | d | c | d | c | d |
| a | b | a | b | a | b | a | b |
| c | d | c | d | c | d | c | d |
| a | b | a | b | a | b | a | b |
| c | d | c | d | c | d | c | d |

CCD 20

FIG. 6

― 3 X 3 PIXEL AREA

| a | b | c | a | b | c | a | b | c |
|---|---|---|---|---|---|---|---|---|
| d | e | f | d | e | f | d | e | f |
| g | h | i | g | h | i | g | h | i |
| a | b | c | a | b | c | a | b | c |
| d | e | f | d | e | f | d | e | f |
| g | h | i | g | h | i | g | h | i |

CCD 20

FIG. 7

INFORMATION INPUT APPARATUS

RELATED APPLICATION

This is a Continuation of application Ser. No. 09/053,009 filed Apr. 1, 1998 now abandoned, which in turn is a Continuation of application Ser. No. 08/831,434 filed Apr. 1, 1997 now U.S. Pat. No. 6,229,953. The entire disclosure of the prior application(s) is hereby incorporated by reference herein in its entirety.

INCORPORATION BY REFERENCE

The disclosures of the following priority applications are herein incorporated by reference: Japanese Patent Applications Nos. 8-081167, filed Apr. 3, 1996, 8-081165 filed Apr. 3, 1996, 9-84770, filed Apr. 3, 1997 and 9-82687, filed Apr. 1, 1997.

BACKGROUND OF THE INVENTION

1. Field of Invention

The present invention relates to an information input apparatus. More particularly, it relates to an information input apparatus whereby, when a second type of information has been input in a format added to a first type of information, after having recorded the first type of information with header information including the input date and time of the first type of information, addition of information can be performed easily by recording the second type of information while annexing header information identical to or related to the first type of information.

2. Description of Related Art

Conventionally, it has been made possible to record video images and sounds on magnetic tape (video tape) using devices such as a video camera.

Furthermore, as a type of information input apparatus to photograph objects, electronic cameras have been used widely that convert the photographic images into digital image data and record it on recording media such as memory cards. Certain conventional digital cameras have a sound recording function. However, such conventional digital cameras record sounds only in a predefined time period for each photographic image when operating the sound recording switch while photographing the objects.

Among the conventional electronic cameras discussed above are those having the function (sound recording time modification switch) of modifying the sound recording time for one frame of the photographic images, e.g., to 15 seconds, 10 seconds, 5 seconds, etc., and the user can set the desired sound recording time per frame of the photographic images by operating this modification switch.

Furthermore, there is also technology that records video images and sounds on a 2-inch, so-called still video floppy. In this case, to record simultaneously the video images and sounds, it is necessary that the tracks on which the video images are recorded be next to those on which the sounds are recorded.

With conventional digital cameras, when first photographing video images using a video camera and thereafter adding sounds to those video images, such operations become complicated since it is necessary to rewind the video tape to the position where it is desired to add the sounds. Furthermore, it is necessary to record the sounds while synchronizing them with the video images recorded in that position. Similar operations become necessary even when the sounds are recorded first and the video images are added thereafter.

Additional problems occur when recording video images and sounds using conventional electronic cameras. For example, to record sounds when photographing objects in continuous mode, such as when photographing at 30 frames per second, it is necessary to synchronize the sound recording time per frame to the photographic interval of one frame ($\frac{1}{30}$ seconds).

When reproducing recorded photographic images and sounds wherein the recording time of the sounds per frame is shorter than the photographic interval at that time, the sounds that get reproduced are disconnected (continuous sounds are not reproduced).

Additionally, when the recording time of the sounds per frame is longer than the photographic interval at that time, once again there is a lack of synchronization between the images and the sound.

Conventional information input apparatus do not include a means for setting the sound recording time to be equal to the photographic interval of each frame in continuous mode, even when using the sound recording time modification switch mentioned above.

Another inherent problem with conventional information input technology such as the still video floppy mentioned above, is that in order to add sounds to recorded video images, it is necessary to empty the tracks next to the tracks on which the video images are recorded, and thereafter to record the sounds on those tracks. Such operations are complicated and time consuming.

SUMMARY OF THE INVENTION

The present invention is made in consideration of the above-discussed inherent problems with conventional information input apparatus, and is intended to make it possible to easily input video images and sounds in proper synchronization.

The information input apparatus of the present invention comprises a photographic means that photographs objects; a sound recording means that records sounds; a first modification means that modifies the number of frames of the photographic images per unit time of the photographic means; a second modification means that modifies the sound recording time of the sound recording means per frame of the photographic images, corresponding to the number of frames of the photographic images modified by the first modification means; and a recording means that records in a first area each frame of the photographic images photographed by the photographic means, and records in a second area the sounds recorded by the sound recording means for each frame of the photographic images.

In the information input apparatus of the present invention, the photographic means photographs objects, and the sound recording means records sounds. The first modification means modifies the number of frames of the photographic images per unit time of the photographic means. The second modification means modifies the sound recording time of the sound recording means per frame of the photographic images, corresponding to the number of frames of the photographic images modified by the first modification means. The recording means records in a first area each frame of the photographic images photographed by the photographic means, and records in a second area the sounds recorded by the sound recording means for each frame of the photographic images.

The information input apparatus of the present invention further comprises an input means that inputs multiple types of information; a conversion means that digitizes the information input by the input means; a detection means that detects the input time of the information input by the input means; an annexing means that annexes to the digitized information header information representing the input time of the input information; a recording means that records the information having annexed the header information; and a reproduction means that reproduces the information recorded by the recording means; whereby, when a second type of information is input while a first type of information recorded by the recording means is being reproduced, the annexing means, annexes to the first type of information and the second type of information the identical or related header information.

In the information input apparatus of the present invention, the input means inputs multiple types of information. The conversion means digitizes the information input by the input means. The detection means detects the input time of the information input by the input means. The annexing means annexes to the digitized information header information representing the input time of the input information. The recording means records the information having annexed the header information. The reproduction means reproduces the information recorded by the recording means. The annexing means, when a second type of information is input while a first type of information recorded by the recording means is being reproduced, annexes to the first type of information and the second type of information the identical or related header information.

BRIEF DESCRIPTION OF THE DRAWINGS

FIG. 6 is a drawing explaining the thinning-out processing of pixels during L mode.

FIG. 7 is a drawing explaining the thinning-out processing of pixels during H mode.

DETAILED DESCRIPTION OF PREFERRED EMBODIMENTS

Figure 1:
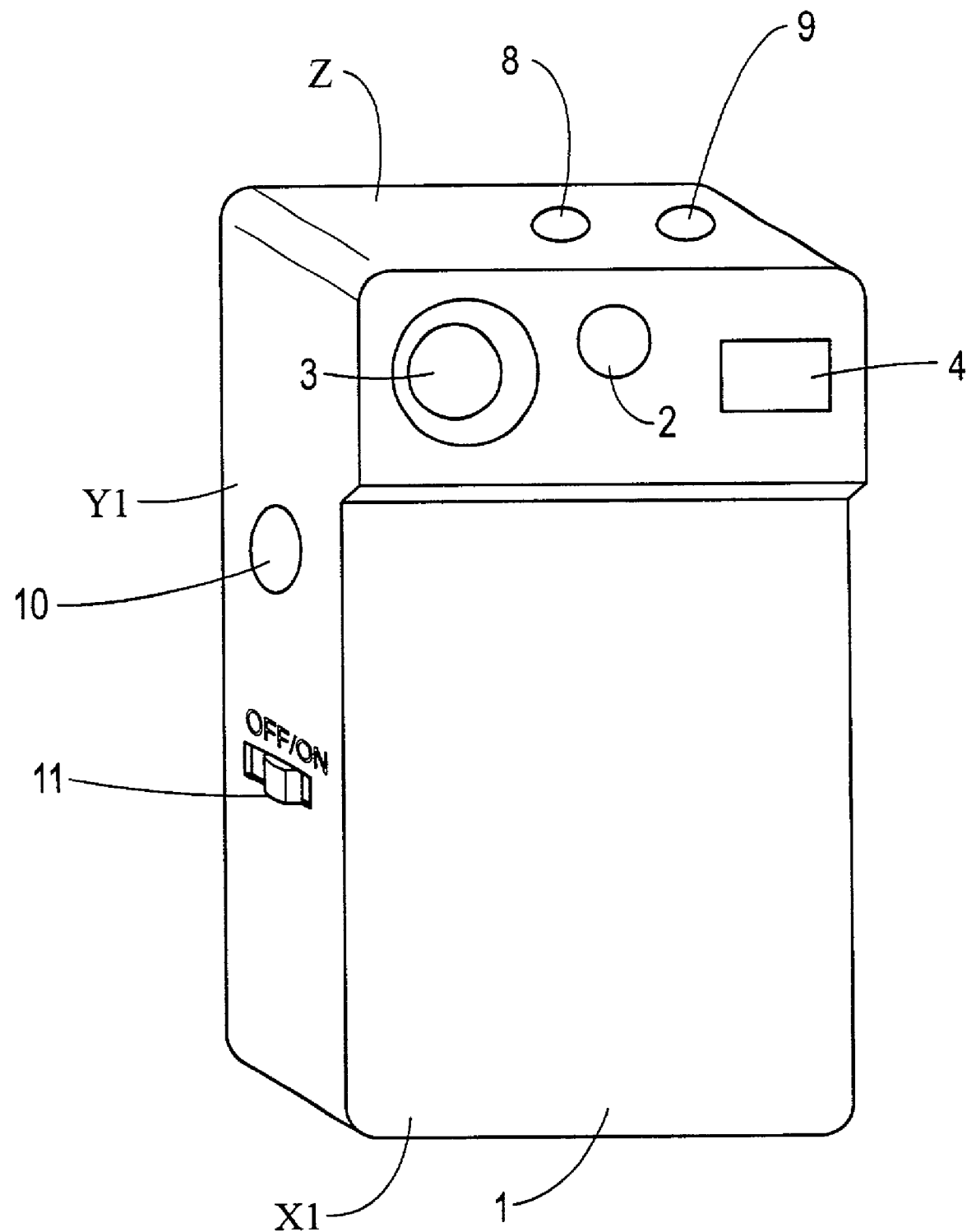
FIG. 1 is a front perspective view of one embodiment of the information input apparatus of the present invention.
Figure 2:
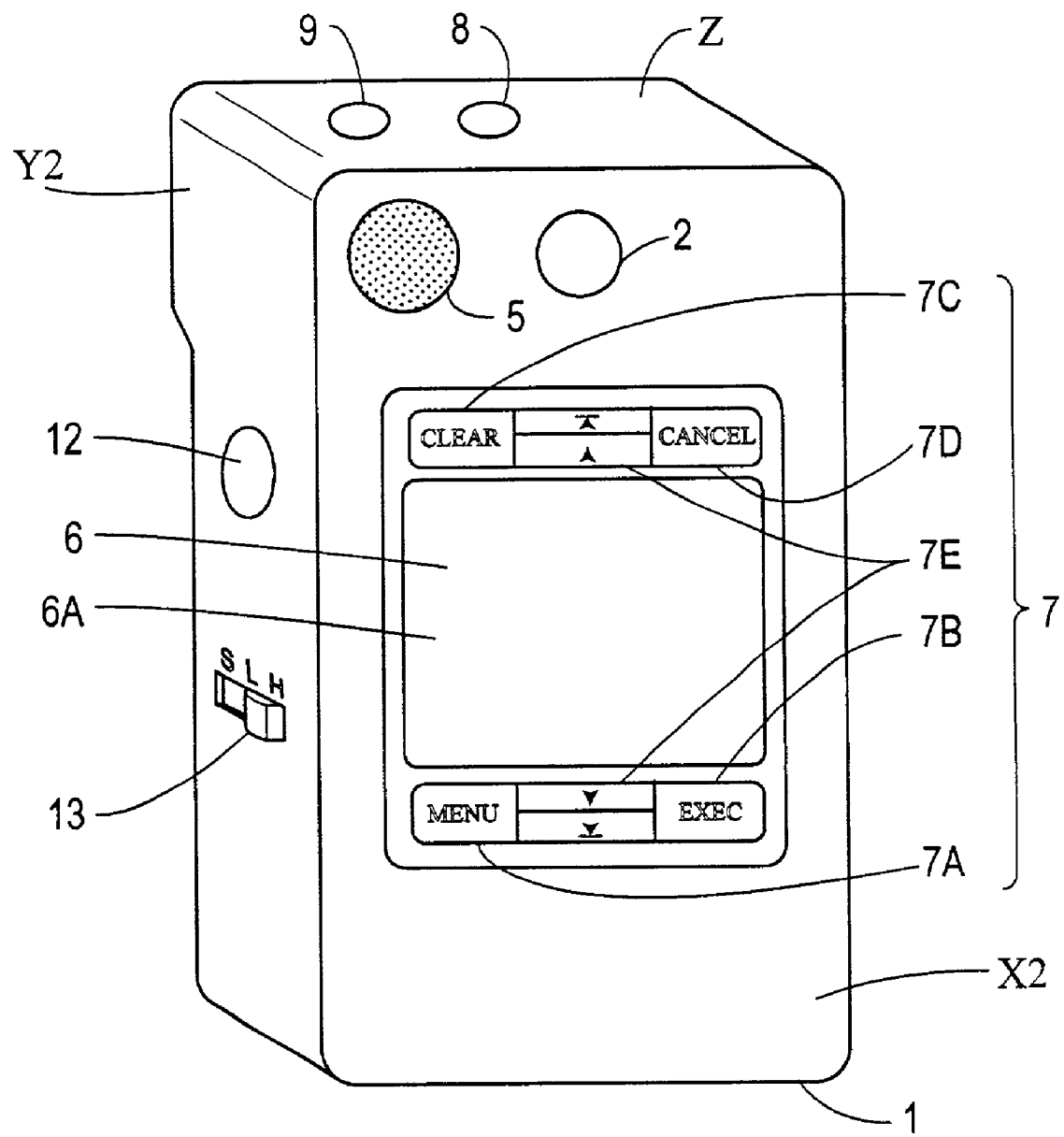
FIG. 2 is a rear perspective view of the information input apparatus shown in FIG. 1.

FIGS. 1 and 2 show the structure of a preferred embodiment of the information input apparatus 1 according to the present invention. When photographing an object with the information input apparatus, the side facing the object is X1, and the side facing the user is X2. Side X1 forms the front surface of input apparatus 1 and side X2 forms the back surface of input apparatus 1. An upper portion of front surface X1 extending across the width of the apparatus 1 projects forward from the rest of the front surface to form an upper projection. A finder 2 used to confirm the photographic range of the object, a photographic lens 3 that takes in the light image of the object, and a flash component 4 that emits light to illuminate the object are all arranged across the upper projection at the upper end of the side X1.

The back end of finder 2 and a speaker 5 for generating sounds recorded by the information input apparatus 1 are provided across the back surface of the apparatus 1, at the upper end of side X2 opposite the upper projection from side X1. Also, an LCD 6 (display device) and operating keys 7A, 7B, 7C, 7D and 7E are positioned on side X2 vertically below the finder 2, photographic lens 3, flash component 4, and speaker 5. A portion of the surface of the LCD 6 comprises a touch tablet 6A. Touch tablet 6A senses contact by a pen-type pointing device and inputs two-dimensional positional information corresponding to the contact.

Touch tablet 6A comprises a transparent resin such as glass resin, and the user can observe through touch tablet 6A the images displayed on LCD 6.

The operating keys 7A, 7B, 7C, 7D and 7E provide various functions such as executing reproduction of the recorded data displayed to the LCD 6. Menu key 7A is the key operated when displaying menu screens (not shown) to the LCD 6. Execute (run) key 7B is the key operated when reproducing recorded information selected by the user (described later).

Clear key 7C is the key operated when deleting recorded information. Cancel key 7D is the key operated when aborting reproduction processing of recorded information. Scroll key 7E is the key operated to scroll the screen up and down when a list of recorded information is displayed to the LCD 6 (described later).

A microphone 8 for collecting sounds (sound recording means) and an earphone jack 9 are provided on the top surface Z of the information input apparatus 1.

A release switch 10, operated when photographing objects, and a power switch 11 (FIG. 11) are provided on the left side (side Y1) of apparatus 1. The release switch 10 and power switch 11 are placed vertically below the finder 2, photographic lens 3, and flash component 4 provided on the upper end of side X1.

A sound recording switch 12, operated when recording sounds, and a continuous mode switch 13 (first modification means) operated to change the number of frames photographed per unit time are provided on the side Y2 (right side) opposite to side Y1. The sound recording switch 12 and continuous mode switch 13 are placed vertically below the finder 2, photographic lens 3, and flash component 4 provided on the upper end of side X1, in the same manner as the release switch 10 and power switch 11 mentioned above. Also, the sound recording switch 12 is positioned at nearly the same height as the release switch 10 on side Y1, and is ergonomically designed such that there is no uncoordinated feeling when the apparatus is held by either the left or right hand.

The heights of the recording switch 12 and the release switch 10 may be made positively different such that, while pressing one of these switches on one side of the device, when holding the opposite side with a finger in order to cancel the moment due to this pressure, the switch provided on this opposite side is not pressed accidentally.

The continuous mode switch 13 mentioned above is used when setting the apparatus to photograph an object in only one frame or to photograph it in a fixed multiple of frames when the user photographs the object by pressing the release switch 10. For example, when the indicator of the continuous mode switch 13 is switched to the position printed with "S" (that is, switched to S mode), only one frame of photography is performed when the release switch 10 is pressed.

Also, when the indicator of the continuous mode switch 13 is switched to the position printed with "L" (that is, switched to L mode), photography of 8 frames per second (that is, it becomes low-speed continuous mode) is performed during the time the release switch 10 is pressed.

Furthermore, when the indicator of the continuous mode switch 13 is switched to the position printed with "H" (that is, switched to H mode), photography of 30 frames per second (that is, it becomes high-speed continuous mode) is performed during the time the release switch 10 is pressed.

Figure 3:
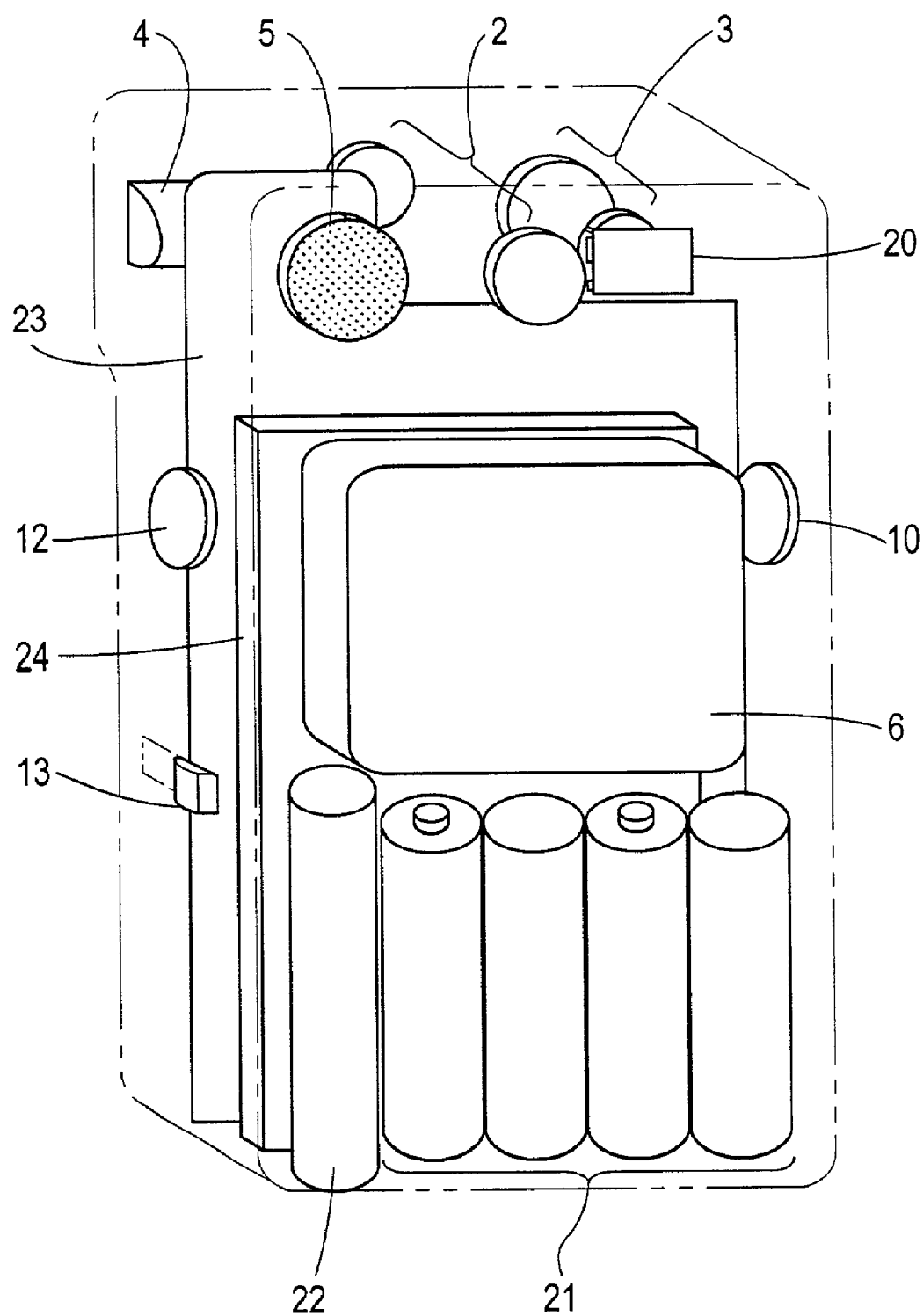
FIG. 3 is a rear perspective view partially showing the internal structure of the information input apparatus shown in FIGS. 1 and 2.

Next, the internal structure of the information input apparatus 1 is explained. FIG. 3 is a perspective drawing showing examples of the internal structure of the information input apparatus shown in FIGS. 1 and 2. A CCD 20 is provided at the rear end (on side X2) of the photographic lens 3. CCD 20 photoelectrically converts the light images of the objects formed via the photographic lens 3 into electrical signals.

Four cylindrical batteries (size AA dry cells) 21 are arranged in apparatus 1 in an upright position vertically below the LCD 6. The electrical power stored in batteries 21 is supplied to the various electrical components of apparatus 1. A condenser 22 for accumulating the necessary charge to operate flash component 4, is placed along side batteries 21.

Control circuits for controlling the function of information input apparatus 1 are contained on a circuit board 23. An installable/removable memory card 24 (recording means) is positioned between circuit board 23 and LCD 6. All types of information input into information input apparatus 1 are recorded in predefined areas of the memory card 24.

Although in the illustrated embodiment the memory card 24 is installable and removable, memory may also be provided directly on the circuit board 23, and various types of information can be recorded in that memory. Also, the various types of information recorded in memory (memory card 24) also may be output to a personal computer via an interface, not shown.

Figure 4:
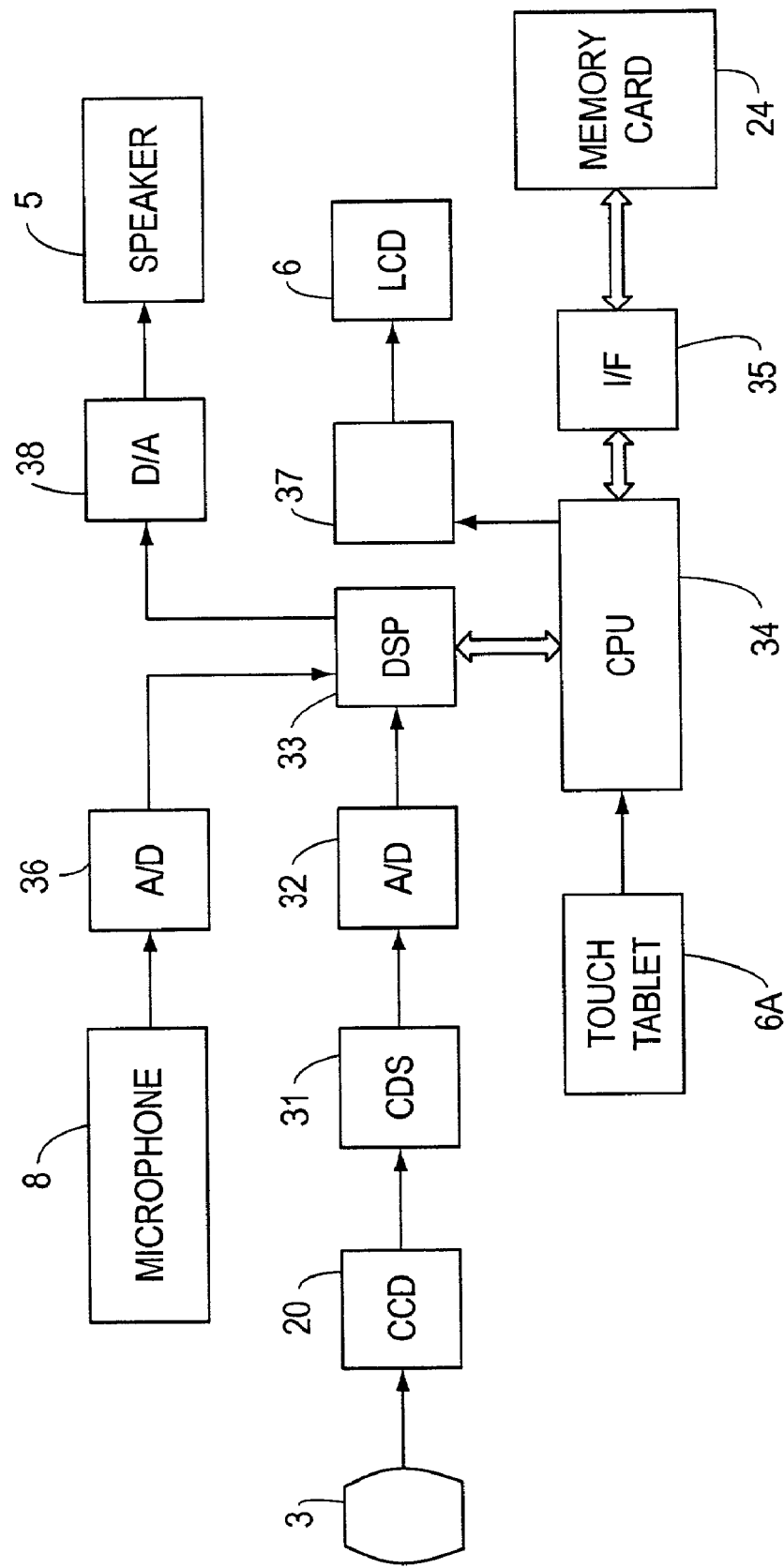
FIG. 4 is a block drawing representative of the interrelationship between internal electrical structure of the information input apparatus shown in FIGS. 1 and 2.

Next, the internal electrical structure of the information input apparatus 1 of the present preferred embodiment is explained, referring to the block drawing of FIG. 4. The CCD 20 having multiple pixels photoelectrically converts into image signals (electrical signals) the light images formed on each pixel.

A correlation duplex sampling circuit (henceforth, CDS) 31 samples at a specified timing the image signals photoelectrically converted by the CCD 20. An analog/digital conversion circuit (henceforth, A/D conversion circuit) 32 (conversion means) digitizes the image signals sampled by the CDS 31 and provides them to a digital signal processor (henceforth, DSP) 33.

The DSP 33 compresses the digitized image signals and outputs them to the CPU 34 (detection means, annexing means, reproduction means). The CPU 34 records the digitized and compressed image signals (henceforth simply, photographic image data) in a specified area (photographic image recording area) of the memory card 24 via an interface (henceforth, I/F) 35.

Also, the CPU 34 contains a clock circuit (not shown,) and it records the date and time photographed as header information of the image data in the photographic image recording area of the memory card 24. The photographic date and time data are annexed to the photographic image data recorded in the photographic image recording area of the memory card 24.

The microphone 8 inputs sound information (collects sounds) and provides that sound information to the A/D conversion circuit 36. The A/D conversion circuit 36 digitizes the provided sound information and outputs it to the DSP 33. The DSP 33 compresses the digitized sound information and outputs it to the CPU 34.

The CPU 34 records the digitized and compressed sound information in a specified area (sound recording area) of the memory card 24 via the I/F 35. Also, at this time, the sound recording date and time data is recorded as header information of the sound data in the sound recording area of the memory card 24.

When a specified position of the touch tablet 6A is pressed by the user's pen-type pointing device, the CPU 34 reads in the X-Y coordinates of the pressed position of the touch tablet 6A, and stores that coordinate data (line-drawing data described later) in an internal buffer memory (not shown.) Also, the CPU 34 records the line-drawing information accumulated in the buffer memory along with line-drawing information input date and time header information in the line-drawing information recording area of the memory card 24.

LCD 6 is connected to the CPU 34 via frame memory 37, and image display is made possible. The image data, having undergone compression processing, is input into the DSP 33, is expanded there, and then is provided to the frame memory 37.

Speaker 5 is connected to the DSP 33 via a digital/analog conversion circuit (henceforth, D/A conversion circuit) 38, and the sound signals analog-converted by the D/A conversion circuit 38 are output from the speaker 5.

Next, the various actions of the information input apparatus 1 of the present preferred embodiment are explained.

First, the input/output processing of sound information of the present apparatus is explained. When the power source is supplied to the information input apparatus 1 by switching the power switch 11, shown in FIG. 1, to the side printed "ON," and the record switch 12 provided on side Y2 is pressed, sound recording processing (input processing of sound information) is started. The sound information is input via the microphone 8, is digitized by the A/D conversion circuit 36, and is output to the DSP 33.

The DSP 33 compresses the digitized sound data. The sound data compressed by the DSP 33 is recorded in the sound recording area of the memory card 24 via the CPU 34 and the I/F 35. At this time, the sound recording date and time data in the sound recording area of the memory card 24 is recorded as header information of the compressed sound data.

The sounds in this case are compressed by the PCM method and recorded, but other methods may be used.

Figure 5:
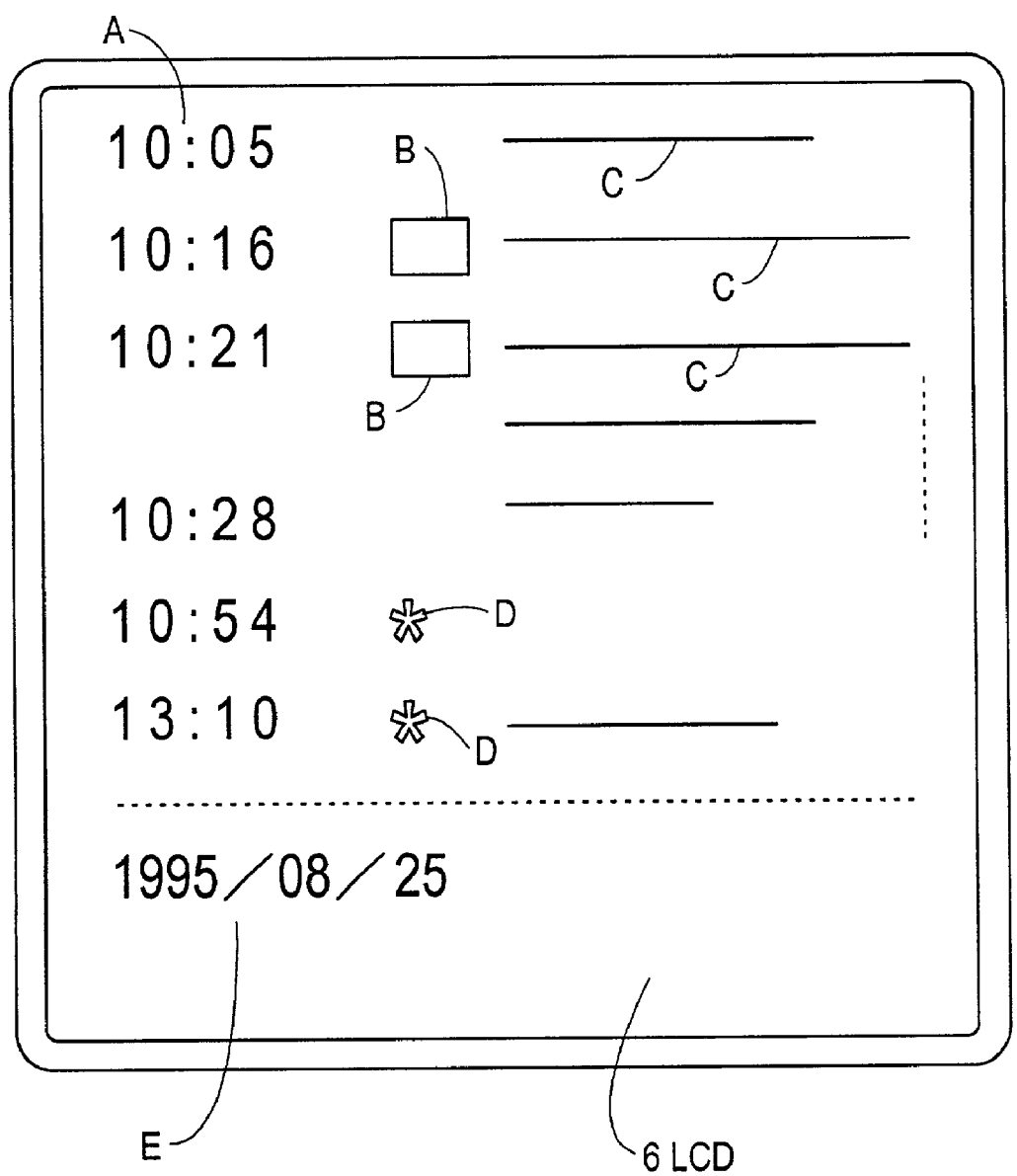
FIG. 5 is an elevational view showing the display screen operated when reproducing recorded information.

When reproducing the sound data recorded in the sound recording area of the memory card 24, the LCD 6 display shown in FIG. 5 is operated. On the LCD 6 display screen shown in FIG. 5 is displayed at the lower end E of the screen the date and the time the information was recorded (in this case, Aug. 25, 1995), and the recording time of the information recorded on that recording date is displayed on the leftmost side of the screen.

On the right next to the recording time A are displayed thumbnail images B and thumbnail image ready symbols "*" D (both described later). The information on this display is information including photographic image data. That is, in the information recorded (input) at "10:16," "10:21," "10:54," and "13:10" photographic image information is included, and in the information recorded at "10:05" and "10:28" photographic image data is not included.

On the right side of the thumbnail image display area a sound information bar C is displayed, and a bar (line) of a length corresponding to the length of the sound recording time is displayed (when sound information is not input, it is not displayed).

The user selects the information to reproduce by pressing with the pen tip of the pen-type pointing device any part of the display line of the desired information on the LCD 6 shown in FIG. 5, and reproduces the selected information by pressing the execute (run) key 7B shown in FIG. 2 with the pen tip of the pen-type pointing device.

For example, when the line shown in FIG. 5, on which "10:05" is displayed, is pressed by the pen-type pointing device, the CPU 34 reads out from the memory card 24 the sound data corresponding to the selected sound recording time (10:05), and provides it to the DSP 33. The sound data (compressed sound data) provided to the DSP 33 is expanded there, and is output to the D/A conversion circuit 38.

The sound signals analog-converted in the D/A conversion circuit 38 are reproduced via the speaker 5. When an earphone (not shown) is connected to the earphone jack 9, the sounds are reproduced via the earphone rather than by the speaker.

Next, the photography of objects and output of the photographic images using the present apparatus is explained.

First, the case when the continuous mode switch 13 provided on side Y2 is switched to the S mode (the mode in which only one frame of photography is performed) is explained. When the power source is supplied to the information input apparatus 1 by switching the power switch 11 shown in FIG. 1 to the side printed "ON," and the release switch 10 provided on side Y1 is pressed, photographic processing of the object is started.

The light image of the object observed by the finder 2 is collected by the photographic lens 3, and is formed on the CCD 20 as multiple pixels. The light image of the object formed on the CCD 20 is photoelectrically converted into image signals by each pixel, and is sampled by the CDS 31. The image signals sampled by the CDS 31 are provided to the A/D conversion circuit 32, and they are digitized there and output to the DSP 33.

The DSP 33 compresses the digitized image signals according to the JPEG (Joint Photographic Experts Group) method, in which discrete cosine conversion, quantization, and Huffinan encoding are applied, and are output to the CPU 34. The CPU 34 records the digitized and compressed photographic image data in the photographic image recording area of the memory card 24 via the I/F 35. At this time, the photographic date and time data in the photographic image recording area of the memory card 24 is recorded as header information of the photographic image data.

When the continuous mode switch 13 is switched to the S mode, only one frame of photography is performed, and further photography is not performed even when the release switch 10 is continuously pressed. Also, when the release switch is continuously pressed, the photographic image is displayed on the LCD 6.

Second, the case when the continuous mode switch 13 is switched to the L mode (the mode in which continuous shooting of 8 frames per second is performed) is explained. When the power source is supplied to the information input apparatus 1 by switching the power switch 11 to the side printed "ON," and the release switch 10 provided on side Y1 is pressed, photographic processing of the object is started.

The light image of the object observed by the finder 2 is collected by the photographic lens 3, and is formed on the CCD 20 as multiple pixels. The light image of the object formed on the CCD 20 is photoelectrically converted into image signals by each pixel, and is sampled by the CDS 31 at a rate of 8 times per second. Also, at this time, the CDS 31 thins out ¾ of the pixels among the electrical image signals of all the pixels of the image in the CCD 20.

That is, the CDS 31 divides the pixels of the CCD 20 arranged in a matrix making 2×2 pixels (four pixels) into one area, as shown in FIG. 6, and samples from that one area the image signal of one pixel placed in a fixed position, thinning out the remaining three pixels.

For example, during the first time of sampling (first frame), the top left pixel a 10 of each area is sampled, and the remaining pixels b, c, and d are thinned out. During the second time of sampling (second frame), the top right pixel b of each area is sampled, and the remaining pixels a, c, and d are thinned out. Following that, during the third and fourth times of sampling, the bottom left pixel c and the bottom right pixel d are sampled, respectively, and the other pixels are thinned out. In short, each pixel is sampled every four frames.

The image signals sampled by the CDS 31 (the image signals of ¼ the pixels of all the pixels in the CCD 20) are provided to the A/D conversion circuit 32, and are digitized there and output to the DSP 33.

The DSP 33 compresses the digitized image signals by the JPEG method, and provides them to the CPU 34. The CPU 34 records the digitized and compressed photographic image data in the photographic image recording area of the memory card 24 via the I/F 35. At this time, the photographic date and time data in the photographic image recording area of the memory card 24 is recorded as header information of the photographic image data.

Third, the case when the continuous mode switch 13 is switched to the H mode (the mode performing continuous shooting of 30 frames per second) is explained. When the power source is supplied to the information input apparatus 1 by switching the power switch 11 to the side printed "ON," and the release switch 10 provided on side Y1 is pressed, photographic processing of the object is started.

The light image of the object observed by the finder 2 is collected by the photographic lens 3, and is formed on the CCD 20. The light image of the object formed on the CCD 20 having multiple pixels is photoelectrically converted into image signals by each pixel, and is sampled by the CDS 31 at a rate of 30 times per second. Also, at this time, the CDS 31 thins out 8/9 of the pixels among the electrical image signals of all the pixels of the image in the CCD 20.

That is, the CDS 31 divides the pixels of the CCD 20 arranged in a matrix making 3×3 pixels into one area, as shown in FIG. 7, and at a rate of 30 times per second, samples from that one area the electrical image signal of one pixel placed in a fixed position, thinning out the remaining eight pixels.

For example, during the first time of sampling (first frame), the top left pixel a of each area is sampled, and the other pixels b through i are thinned out. During the second time of sampling (second frame), the pixel b located to the right of a is sampled, and the other pixels a and c through i are thinned out. Following that, during the third time of sampling and on, the pixel c, pixel d, . . . , are variously sampled, and the other pixels are thinned out. In short, each pixel is sampled every nine frames.

The image signals sampled by the CDS 31 (the image signals of 1/9 the pixels of all the pixels in the CCD 20) are provided to the A/D conversion circuit 32, and are digitized there and output to the DSP 33.

The DSP 33 compresses the digitized image signals by the JPEG method, and outputs them to the CPU 34.

The CPU 34 records the digitized and compressed photographic image data in the photographic image recording area of the memory card 24 via the I/F 35, annexing the photographic date and time header information.

When reproducing the photographic image data recorded on the memory card 24, it is done in the same manner as the reproduction processing of the sound data described above by operating the display screen of the LCD 6 shown in FIG. 5. The thumbnail images B shown in FIG. 5 are those created by thinning out (contracting) the bit-mapped data of each image of the photographic image data recorded on the memory card 24.

In this case, the photographed image information is included in the information of the line on which the thumbnail images B or the thumbnail image ready symbols "*" D is displayed within the display screen shown in FIG. 5. The user selects that information by pressing on the desired thumbnail image B with the pen tip of the pen-type pointing device, and reproduces the selected information by pressing the execute (run) key 7B.

The CPU 34 reads out from the memory card 24 the photographic image data corresponding to the selected photographic date and time, and provides it to the DSP 33. The DSP 33 then expands the provided photographic image data (compressed photographic image data), and outputs it again to the CPU 34. The CPU 34 stores for a time in frame memory 27 this photographic image data as bit-mapped data, and displays it to the LCD 6.

The images photographed in S mode are displayed as static images on the LCD 6. These static images are those having reproduced the image signals of all the pixels of the CCD 20.

The images photographed in L mode are displayed continuously at a rate of 8 frames per second on the LCD 6. At this time, the number of pixels displayed in each frame is ¼ the total number of pixels of the CCD 20.

Ordinarily, because the human eye reacts sensitively to the degradation of the resolution of static images, the thinning out of the pixels of static images is taken as a degradation of image quality by the user. However, when the continuous shooting speed during photography rises, such as the 8 frames per second being photographed in L mode, and these images are reproduced at a speed of 8 frames per second, the number of pixels of each frame becomes ¼ the number of pixels of the CCD 20. Because the human eye observes the images at 8 frames per second, the amount of information that enters the human eye in one second is twice in comparison to the case with static images.

That is, if the number of pixels of one frame of an image photographed in S mode is 1, then the number of pixels of one frame of an image photographed in L mode is ¼. The amount of information that enters the human eye in one second when the image photographed in S mode (static image) has been displayed to the LCD 6 becomes 1=(1 pixel)×(1 frame)). On the other hand, the amount of information that enters the human eye in one second when the images photographed in L mode are displayed to the LCD 6 becomes 2=((¼ pixels)×(8 frames)), that is, two times the amount of information of the static image enters the human eye. Consequently, even though the number of pixels in one frame is ¼, during reproduction the user can observe the reproduced images without noticing any degradation of the image quality.

Furthermore, in the present preferred embodiment, because each frame samples a different pixel, and those sampled pixels are displayed to the LCD 6, there is a residual effect in the human eye, and even though ¾ of the pixels per frame have been thinned out, the user can observe the images photographed in L mode displayed to the LCD 6 without noticing any degradation of the image quality.

Also, the images photographed in H mode are displayed continuously at a rate of 30 frames per second on the LCD 6. At this time, the number of pixels displayed in each frame is 1/9 the total number of pixels of the CCD 20, but for the same reason as the case of L mode, the user can observe the images photographed in H mode displayed to the LCD 6 without noticing any degradation of the image quality.

In the present preferred embodiment, because the CDS 31 thins out the pixels of the CCD 20 to the extent that the degradation of the image quality during reproduction is not noticed when the objects are photographed in L mode and H mode, the load on the DSP 33 can be reduced, and the DSP 33 can be operated at low speed and low power. Also, by doing this, it becomes possible to reduce the cost and reduce the power consumption of the apparatus.

According to need, light can be projected on the objects by operating the flash component 4.

Next, the operation when inputting two-dimensional information (pen input information) from the touch tabled 6A is explained. When the touch tablet 6A is pressed by the pen tip of the pen-type pointing device not shown, the X-Y coordinates of the touched location are input into the CPU 34. These X-Y coordinates are stored in the internal buffer memory (not shown) of the CPU 34, and the data is written into the locations within the frame memory 37 corresponding to each point of the X-Y coordinates mentioned above, and is displayed on the LCD 6.

Because the touch tablet 6A formed on the surface of the LCD 6 is composed of a transparent material, as explained above, the user can observe the points (the points pressed by the pen tip of the pen-type pointing device) displayed on the screen, and can feel just as if having performed pen input directly on the LCD 6. Also, when moving the pen-type pointing device on the touch tablet 6A, a line is displayed on the LCD 6 following the movement of the pen-type pointing device. Furthermore, when intermittently moving the pen-type pointing device on the touch tablet 6A, a broken line is displayed on the LCD 6 following the movement of the pen-type pointing device. In the above manner, the user inputs on the touch tablet 6A (LCD 6) the desired line-drawing information such as characters and figures, and the like.

Also, when line-drawing information is input using the pen-type pointing device while photographic images are displayed on the LCD 6 as described above, this line-drawing information is composed in the frame memory 37 along with the photographic image information, and is displayed at the same time on the LCD 6.

The user can select the colors of the line drawings displayed on the LCD 6 from the colors black, white, red, blue, and the like.

When the execute (run) key 7B of the operating keys 7 is pressed after input of the line-drawing information to the touch tablet 6A using the pen-type pointing device, the line-drawing information stored in the internal buffer memory of the CPU 34 is provided to the memory card 24 via the I/F 35 along with the input date and time header information, and it is recorded in the line-drawing recording area of the memory card 24.

The line-drawing information recorded on the memory card 24 is information having undergone compression processing. Because the line-drawing information input into the touch tablet 6A includes a great deal of information of high spatial frequency, when performing compression processing by the JPEG method used for compression of the photographic images mentioned above, the compression efficiency is poor and the amount of information does not become small, and the time needed for compression and expansion gets longer. Furthermore, because compression by the JPEG method is irreversible compression, it is not suitable for compression of line-drawing having a small amount of information (because gathering and spreading become prominent due to gaps of the information when expanded and displayed on the LCD 6).

Thus, in the present preferred embodiment, the line-drawing information is compressed by the run-length method as used in facsimiles, and the like. The run-length method is a method of compressing line-drawing information by scanning the line-drawn screen in the horizontal direction, and coding the running lengths of the (points of) information of each color being black, white, red, blue, and the like, and the running lengths of the non-information (the parts having no pen input).

By using this run-length method, it is possible to compress the line-drawing information to its smallest, and also, it becomes possible to suppress the gaps of information even when having expanded the compressed line-drawing information. When the amount of information of the line-drawing information is comparatively small, it is also possible not to compress it.

Also, as described above, when performing pen input while photographic images are displayed on the LCD 6, the photographic image data and the pen-input line-drawing information are composed in the frame memory 37, and the composed image of the photographic images and the line drawings is displayed on the LCD 6. On the other hand, in the memory card 24, the photographic image data is recorded in the photographic image recording area, and the line-drawing information is recorded in the line-drawing information recording area. In this manner, because each is recorded in a different area, the user can delete the images of either side (for example, the line drawings) from the composed image of the photographic images and the line drawings, and furthermore, it is also possible to compress each image information by separate compression methods.

In the present preferred embodiment, as described above, to each type of information (data) recorded on the memory card 24 is annexed as header information the data of the date and time the various types of information were input. The user can reproduce the desired information by selecting it from the date and time data displayed on the LCD 6 (FIG. 5).

When multiple types of information (photographic images, sounds, line drawings) have been input simultaneously, although the various types of information are recorded separately in the specified areas on the memory card 24, mutually identical date and time header information is annexed to each of the various types of information.

For example, when information P (photographic images), information Sn (sounds), and information Ln (line drawings) have been input simultaneously, each type of information P, Sn, and Ln recorded in the specified area of the memory card 24 has the identical input date and time data. Also, the header information of information P may be made the data of the input time, and the header information of information Sn and Ln may be made data indicating they are related to information P.

By doing as above, the information that was input simultaneously is reproduced simultaneously during reproduction.

Also, in the present preferred embodiment, after the first type of information (for example, photographic images) has been recorded, the second type of information different from the first type of information (for example, line drawings) can be recorded in a form appended to the first type of information. In this manner, when adding the second type of information appended to the first type of information, the second type of information can be input in the state wherein the first type of information has been reproduced. This case is explained in detail below.

For example, while prerecorded sound information is being reproduced, and when the release switch 10 is pressed and photographic processing of an object is performed, the date and time header information from when the recording of that sound information was started is annexed to the photographic image data recorded in the photographic image recording area of the memory card 24.

Also, during reproduction of the sound information for which recording was started, for example, at 10:05 of Aug. 25, 1995, when photographic processing is performed one minute after the start of reproduction (that is, when the reproduction data has become 10:06 of Aug. 25, 1995), the header information of 10:06 of Aug. 25, 1995 is annexed to the photographic image data recorded in the photographic image recording area of the memory card 24. (The starting moment (10:05) may be made to serve as the header information, or either side may be registered to serve as the default (that selection may be made dependent on the user)).

In the same manner, while prerecorded sound information is being reproduced, and when line-drawing information is input, the identical header information as the recording date and time header information of the sound information is recorded along with that line-drawing information in the line-drawing information recording area of the memory card 24.

While sound information and photographic image information previously input simultaneously are being reproduced, and when line-drawing information is input, the identical header information as the recording date and time header information of the sound information (or the photographic image information) is recorded along with that line-drawing information in the line-drawing information recording area of the memory card 24.

While sound information and line-drawing information previously input simultaneously are being reproduced, and when photographic image information is input, the identical header information as the recording date and time header information of the sound information (or the line-drawing information) is recorded along with that photographic image data in the photographic image recording area of the memory card 24.

While photographic images previously input are being reproduced, and when sound information is input, the identical header information as the recording date and time header information of the photographic images is recorded along with that sound data in the sound information recording area of the memory card 24.

While photographic images previously input are being reproduced, and when line-drawing information is input, the identical header information as the recording date and time header information of the photographic images is recorded along with that line-drawing information in the line-drawing information recording area of the memory card 24.

While photographic image information and line-drawing information previously input simultaneously are being reproduced, and when sound information is input, the identical header information as the recording date and time header information of the photographic image information (or the line-drawing information) is recorded along with that sound data in the sound recording area of the memory card 24.

While line-drawing information previously input is being reproduced, and when photographic image information is input, the identical header information as the recording date and time header information of the line-drawing information is recorded along with that photographic image data in the photographic image recording area of the memory card 24.

While line-drawing information previously input is being reproduced, and when sound information is input, the identical header information as the recording date and time header information of the line-drawing information is recorded along with that sound data in the sound recording area of the memory card 24.

Figure 15:
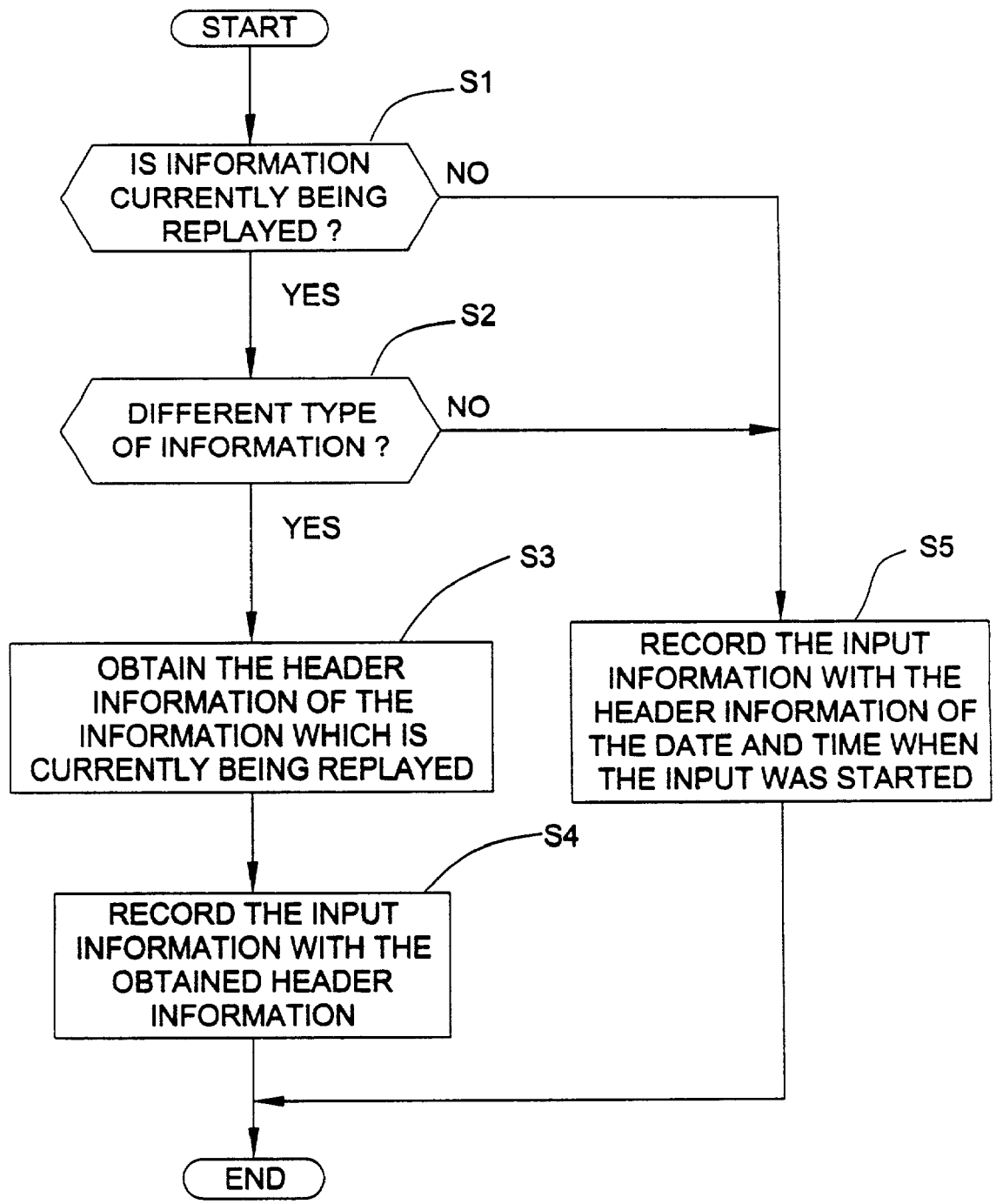
FIGS. 15–20 are flowcharts showing processing performed by the controller according to various aspects of the invention.

The above-discussed examples are explained with reference to FIG. 15. FIG. 15 shows the recording control performed by the CPU 34 for new information including any of a photographed image, sound information or line drawing information, and the accompanying header information. The processing of the flow chart which is shown in FIG. 15 is started when any one of the release switch 10, the recording switch 12 or the touch tablet 6A is operated, and any one of a photograph image, sound information or line drawing information is input.

The program which is shown in the flow chart of FIG. 15 is stored in a ROM which is in the CPU 34, but which is not shown in the figures. Moreover, the program which is shown in the flow chart of FIG. 15 can be supplied to the user in the condition of being stored in the ROM in the CPU 34, or can be supplied to the user in the condition of being stored on a recording medium such as a CD-ROM so that it can be copied to the ROM in the CPU 34.

In FIG. 15, in step S1, the CPU 34 determines whether any one of the photographed image, sound information or line drawing information is currently being replayed. If it is not currently being replayed, it proceeds to step S5. Any one of the information of the photographic image, the sound information, or the line drawing information, that was input by the operation at the start of the routine is recorded in the memory card 24 along with the header information of the date and time that the recording commenced, completing the processing. If any of the recorded information is currently being replayed at step S1, the processing continues to step S2.

In step S2, it is detected whether the information that is being replayed is the photographed image, the sound information or the line drawing information. Then it is determined whether the information being replayed is a different type of information than the newly input information. If it is not a different type of information, the processing continues to step S5. Any one of the information of the photographic image, the sound information, or the line drawing information that was input by the operation at the start of the routine is recorded in the memory card 24 along with the header information of the date and time that the input of that information commenced, completing the processing. If the information being replayed is a different type of information, the processing continues to step S3.

In step S3, the header information of date and time of the information currently being replayed is obtained. Next, the processing continues to step S4, the photographed image, the sound information or the line drawing information that was input by the operation at the start is recorded in the memory card 24 along with the header information that is same as the header information of date and time obtained at step S3, and then processing is completed.

In the above manner, while the first type of information previously input is being reproduced, and when the second type of information is input, the recording date and time of the first type of information become the header information of the second type of information (henceforth, ordinary mode). By doing thus, even when appending information from later on, the relationships between the original information and the appended information can be preserved.

An alternative embodiment of the present invention allows for modification of the recording date and time header to be annexed to input information. When adding a second type of information to a first type of information previously recorded, the input time of the second type of information can be recorded as the header information of the second type of information, and the existing header information of the first type of information may be replaced with the header information of the second type of information, hence modifying the recording date and time header of the first type of information (modification mode). With this alternative embodiment, a recording date and time mode switch (not shown) can be provided on the information input apparatus 1, and modification of the recording date and time header information can be performed when the user selects the modification mode.

For example, when the user plans to photograph a specific object at a specific time on a later date, and has recorded in advance as line-drawing information a comment about that photographic image (that is, the line-drawing information is the first type of information), the recording date and time mode switch mentioned above is switched to the recording date and time modification mode, and the object mentioned above is photographed while reproducing the recorded line-drawing information (that is, the photographic image becomes the second type of information). Thus, the input date and time of the photographic image (second type of information) is annexed as header information to both the line-drawing information (first type of information) and the photographic image (second type of information).

Figure 16:
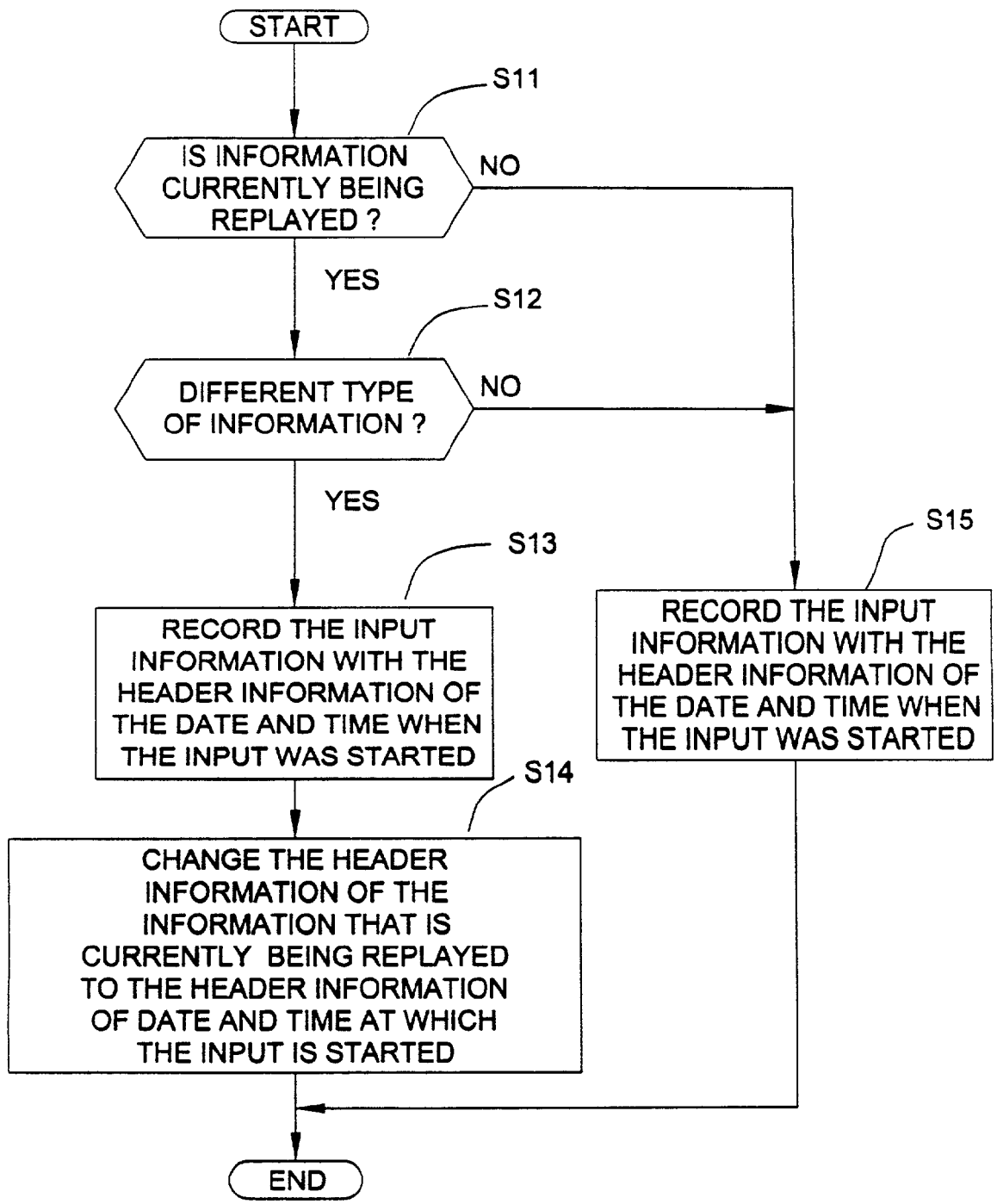

The above-mentioned example is explained with reference to FIG. 16. FIG. 16 shows the recording control, performed by the CPU 34, of new information of any photographed image, sound information or line drawing information, and the accompanying header information. The processing of the flow chart which is shown in FIG. 16 is started when any one of the release switch 10, the recording switch 12 or the touch tablet 6A is operated, and any one of a photographed image, sound information or line drawing information is input.

The program which is shown in the flow chart of FIG. 16 is stored in a ROM, which is in the CPU 34, but which is not shown in the figure. Moreover, the program that is shown in the flow chart of FIG. 16 can be supplied to the user in the condition of being stored in the ROM in the CPU 34, or can be supplied to the user in the condition of being stored on a recording medium such as a CD-ROM so that it can be copied to the ROM in the CPU 34.

In FIG. 16 at step S12, the CPU 34 determines whether any one of a photographed image, sound information or line drawing information is currently being replayed. If none of the types of information are currently being replayed, the processing continues to step S15. Any one of the information of the photographic image, the sound information, or the line drawing information that was input by the operation at the start is recorded in the memory card 24 along with the header information of the date and time that the recording of that information commenced, and then the processing is completed. If any of the types of information are currently being replayed, the processing continues to step S12.

In step S12, it is detected whether the information that is currently being replayed is any of a photographed image, sound information or line drawing information. Then it is determined whether the information being replayed is a different type of information than the newly input information. If the information being replayed is not a different type of information, the processing continues to step S15. Any one of the information of the photographic image, the sound information, or the line drawing information that was input by the operation at the start is recorded in the memory card 24 along with the header information of the date and time that the input of that information commenced, and then the processing is completed. If the information being replayed is a different type of information, the processing continues to step S13.

In step S13, any one of the photographed image, the sound information or the line drawing information is recorded in the memory card 24 along with the header information of the date and time at which the input was started.

Next, in step S14, the header information of the information that is currently being replayed is changed to be the same as the header information of the information that was recorded in the step 13, and then the processing is completed.

Also, a priority order may be attached to the input information, and the input date and time header information may be annexed to each type of information corresponding to that priority order.

For example, in the case of having made the priority order of photographic images the first, the priority order of sounds the second, and the priority order of line-drawing information the third, when inputting sound information while reproducing previously recorded line-drawing information, the header information including the input time of the sound information is annexed to both the line-drawing information and the sound information recorded on the memory card 24 (because the priority order of the sound information is higher than the priority order of the line-drawing information). Furthermore, when inputting photographic images while reproducing the sound information and the line-drawing information, the header information including the input time of the photographic images is annexed to the line drawing information, the sound information, and the photographic images recorded on the memory card 24 (because the priority order of the photographic images is higher than the priority order of the other types of information). This priority order may be made settable by the user.

Figure 17:
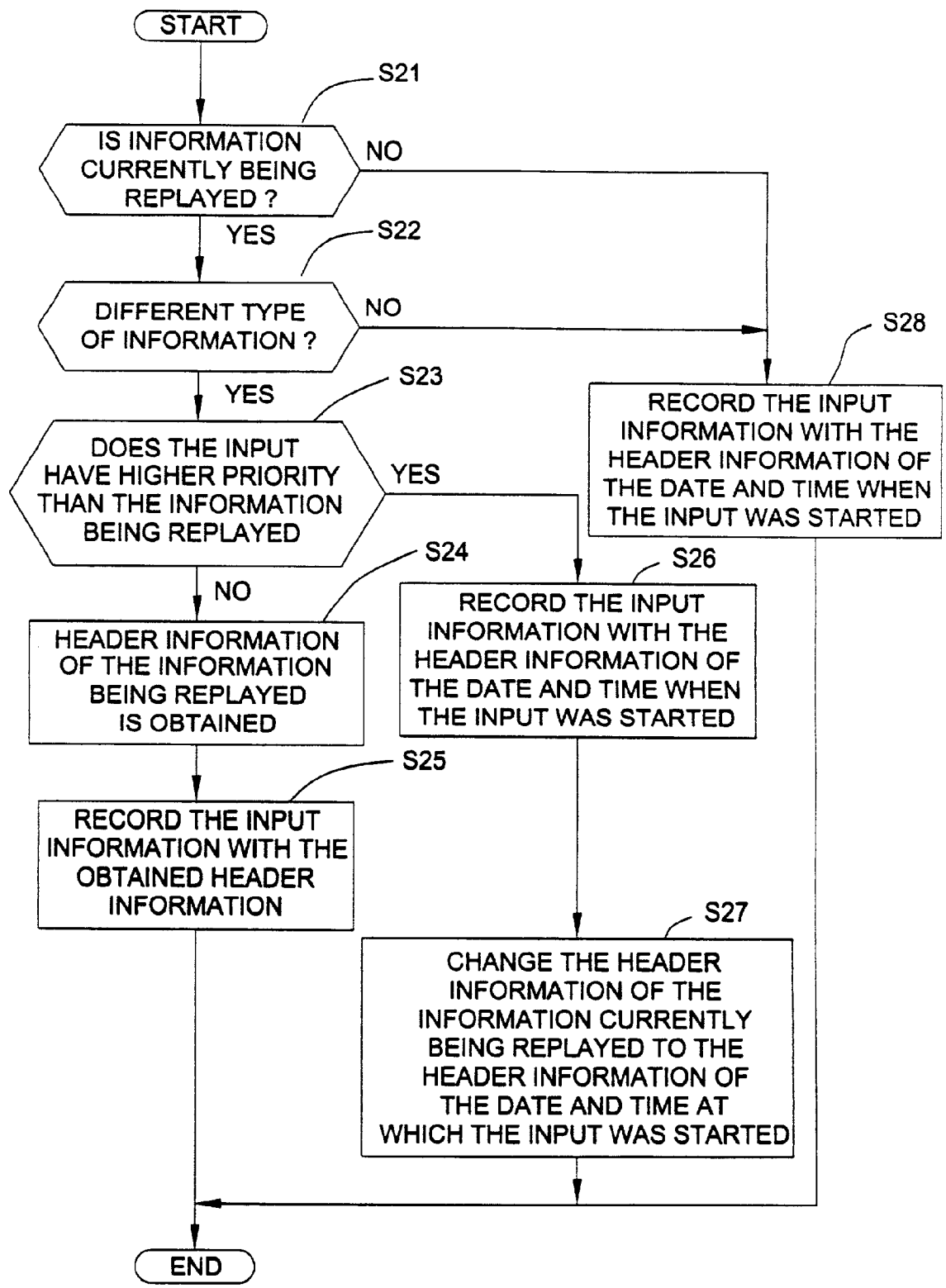

The above-mentioned example is explained with reference to FIG. 17. FIG. 17 shows the recording control performed by the CPU 34, of new information of any of a photographed image, sound information or line drawing information, and the accompanying header information. The processing of the flow chart which is shown in FIG. 17 is started when any one of the release switch 10, the recording switch 12 or the touch tablet 6A is operated, and any one of a photographed image, sound information or line drawing information is input.

The program which is shown in the flow chart of FIG. 17 is stored in a ROM, which is in the CPU 34, but which is not shown in the figure. Moreover, the program that is shown in the flow chart of FIG. 17 can be supplied to the user in the condition of being stored in the ROM in the CPU 34, or can be supplied to the user in the condition of being stored on a recording medium such as a CD-ROM so that it can be copied to the ROM in the CPU 34.

In FIG. 17 at step 21, the CPU 34 determines whether any of a photographed image, sound information or line drawing information is currently being replayed. If the information is not currently being replayed, the processing continues to step S28. Any one of the information of the photographic image, the sound information, or the line drawing information that was input by the operation at the start is recorded in the memory card 24 along with the header information of the date and time that the recording of that information commenced, and then the processing is completed. If the information is currently being replayed, the processing continues to step S22.

In step S22, it is detected whether the information that is currently being replayed is any of a photographed image, sound information or line drawing information. Then it is determined whether the information being replayed is a different type of information than the newly input information. If the information being replayed is not a different type of information, the processing continues to step S28. Any one of the information of the photographic image, the sound information, or line drawing information that was input by the operation at the start is recorded in the memory card 24 along with the header information of the date and time that the input of that information commenced, and then the processing is completed. If the information being replayed is a different type of information, the processing continues to step S23.

In step S23, it is determined whether the input information has a higher priority than the information currently being replayed. If the priority of the input information is lower, the processing continues to step S24, and if the priority of the input information is higher, the processing continues to step S26.

Next, in step S24, the header information of the information that is currently being replayed is obtained. In step S25, any one of the photographed image, the sound information or the line drawing information is recorded in the memory card 24 along with the header information that is the same as the header information of the date and time obtained in step S23, and then the processing is completed.

In step 26, the photographed image sound information or line drawing information that was input by the operation at the start is recorded in the memory card 24 along with the header information of the date and time at the start of the input of the information.

In step S27, the header information of the information being replayed is changed to the same header information as the header information of the information recorded in step S26, and then the processing is completed.

In FIGS. 15 and 17, when other information is recorded during replay of specified information, the header information of the same date and time is added to both the information that is being replayed and the information that is recorded. However, it does not necessarily have to be the same date and time header information. Any header information which informs the information input apparatus of the present embodiment of the relation between the photographed image and the sound information is acceptable, such as the photograph frame number information.

Next, the case of recording sounds when photographing objects is explained.

First, the case when the continuous mode switch 13 is switched to the S mode (single shooting mode) is explained. When the sound recording switch 12 is pressed at the start, the input of sound information is performed, and recording start date and time header information is recorded along with the sound data in the sound information recording area of the memory card 24. Also, when the release switch 10 is pressed (S mode) during input of the sound information, the object is photographed in one frame, and that photographic image data is recorded on the memory card 24. To this photographic image data is annexed the header information of the date and time when the release switch 10 was pressed (photography start time).

On the other hand, when the release button 10 is pressed at the start, the object is photographed in one frame. At this time, the date and time of the photography is recorded as header information to the photographic image data recorded on the memory card 24. Furthermore, when the release button 10 is continuously pressed, the photographed image is displayed on the LCD 6, and at this time, when the record switch is pressed, sound recording is input. At this time, the date and time of the photography is annexed as header information to the sound data recorded in the sound information recording area of the memory card 24.

Next, the case when the continuous mode switch 13 is switched to the L mode or H mode (continuous mode) is explained. First, the case when the release switch 10 and the sound recording switch 12 have been pressed simultaneously is explained with reference to FIG. 8.

When the continuous mode switch 13 is switched to the L mode, photography of 8 frames per second is performed, and the header information of the date and time each frame was photographed is annexed to each frame of the photographic image data recorded in the photographic image recording area of the memory card 24. Consequently, a date and time in 0.125 second intervals is recorded for the header of each frame. Also, at this time, the sound information is recorded each 0.125 second (however, it is input continuously), and the date and time header information is recorded in 0.125 second intervals also for the sound data recorded in the sound information recording area of the memory card 24.

Figure 8:
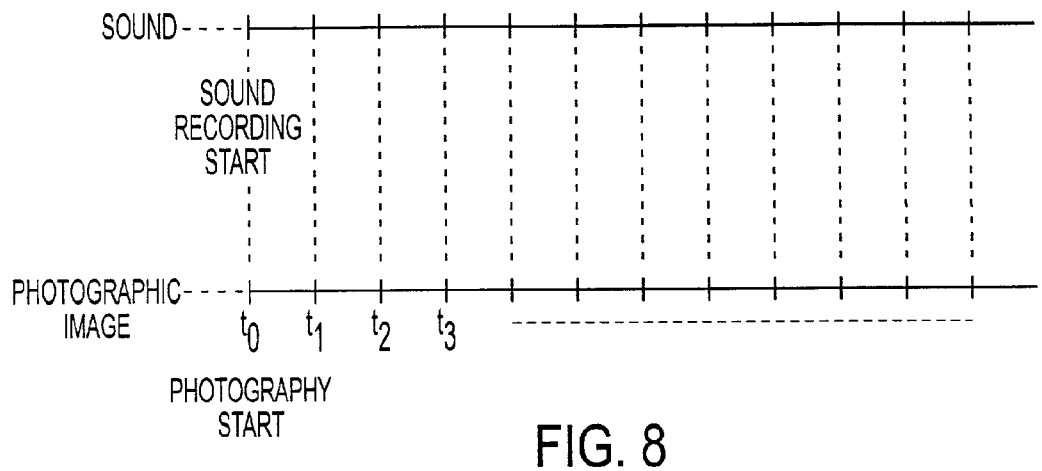
FIG. 8 is a drawing explaining the header information of each type of information when having pressed simultaneously the release switch 10 and the sound recording switch 12.

That is, photography starts at the moment $t_0$ shown in FIG. 8, two frames have been photographed at $t_1$ being 0.125 seconds thereafter, and following that, each frame is photographed at each 0.125 seconds (moments $t_2$, $t_3$, . . . ). Also, each frame of the photographic images is recorded variously along with the header information of the moments $t_0$, $t_1$, $t_2$, . . . in the photographic image recording area of the memory card 24.

Also, in this case, because the record switch 12 has been pressed simultaneously with the release switch 10, sound recording is started at moment $t_0$. Recording of the sound information ends momentarily at moment $t_1$, and is started again from moment $t_1$. Following that, in the same manner, recording of the sound information is started anew in moments $t_2$ and $t_3$ (consequently, the sound information becomes a continuously input condition). That is, the sound recording time is identical to the time of the photographic intervals, and is synchronized with the photographic timing of each frame of the photographic images. Also, the sound data having the header information of the moments is $t_0$, $t_1$, $t_2$ . . . annexed is recorded each in a separate file.

Figure 18:
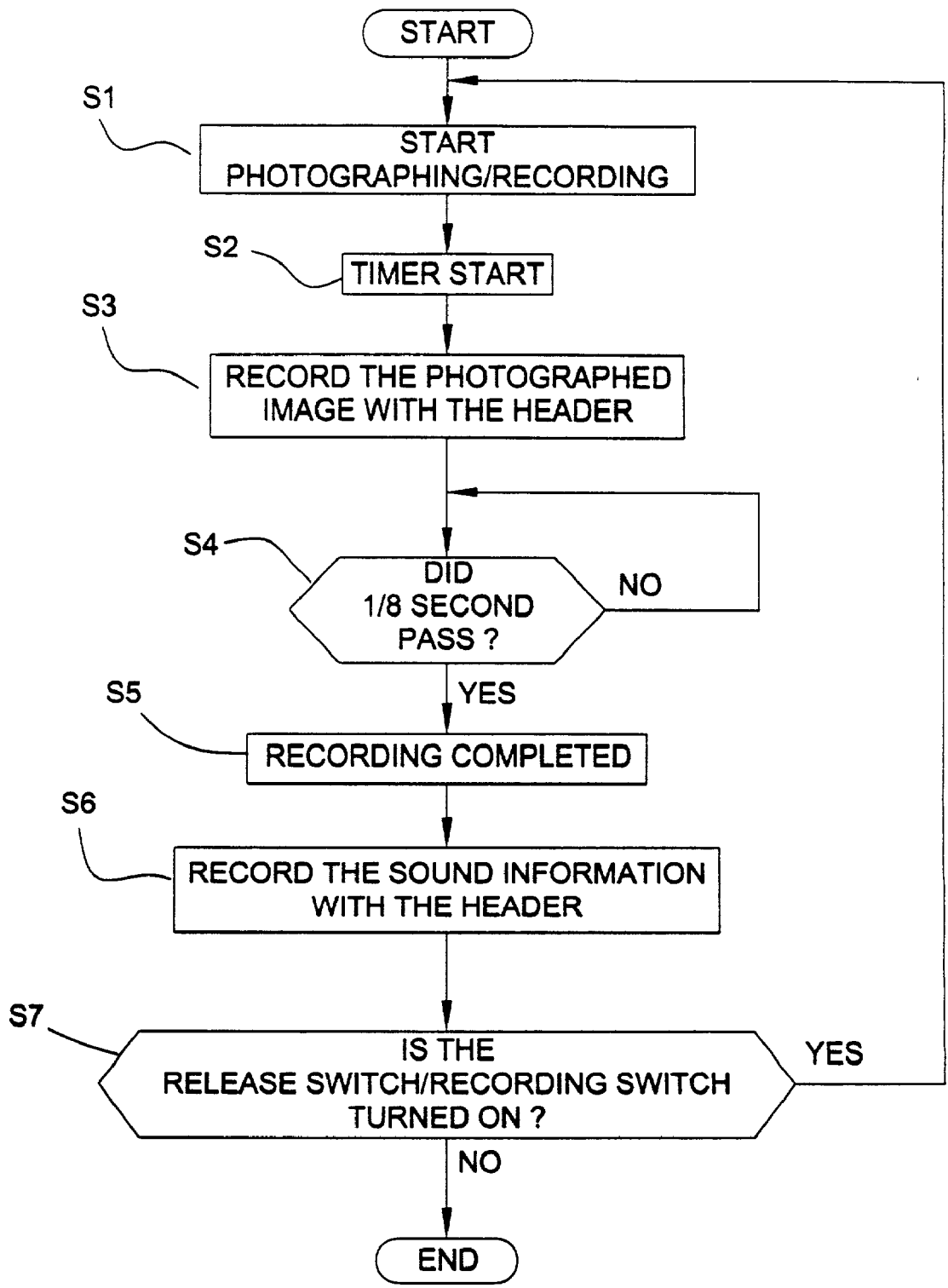

Referring to FIG. 18, the photographing and recording control performed by CPU 34 when the continuous photography mode switch 13 is switched to the L mode is explained. The processing of the flow chart which is shown in FIG. 18 is started when the release switch 10 and the recording switch 12 are simultaneously pressed.

The program which is shown in FIG. 18 is stored in the ROM, which is in the CPU 34, but which is not shown in the figure. Moreover, the program which is shown in the flow chart of FIG. 18 can be supplied to the user in the condition of being stored in the ROM in the CPU 34, or can be supplied to the user in the condition of being stored in a recording medium such as a CD-ROM so as to be capable of being copied to the ROM in the CPU 34.

In FIG. 18, photographing and recording commences at step S1.

In step S2, the clock counting is started by the clock circuit, which is stored in the CPU 34, for evaluating time at the later step S4.

In step S3, the header information of date and time and the photographed image are recorded in the photographed image recording area of the memory card 24.

In step S4, it is determined through the clock circuit whether ⅛ second has elapsed, and if ⅛ second has not elapsed yet, the evaluation will continue. If ⅛ second is passed, the processing continues to step S5, and the recording is completed.

In step S6, the sound information is recorded in the sound information recording area of the memory card 24 with the same header information of date and time as the photograph image which was recorded in step S3.

In step S7, it is detected whether the release switch 1 and the recording switch 13 are continuously pressed, and if they are not pressed, the processing will be completed. When it is detected that the release switch and the recording switch are still pressed, the processing returns to step S1.

In the same manner, when the continuous mode switch 13 is switched to the H mode, photography of 30 frames per second is performed, and the header information of the date and time each frame was photographed is annexed to each frame of the photographic image data recorded in the photographic image recording area of the memory card 24. Consequently, a date and time in ⅟30 second intervals is recorded for the header of each frame. Also, at this time, the sound information is recorded every ⅟30 seconds (however, it is input continuously), and the date and time header information is recorded in ⅟30 second intervals also for the sound data recorded in the sound information recording area of the memory card 24.

Figure 19:
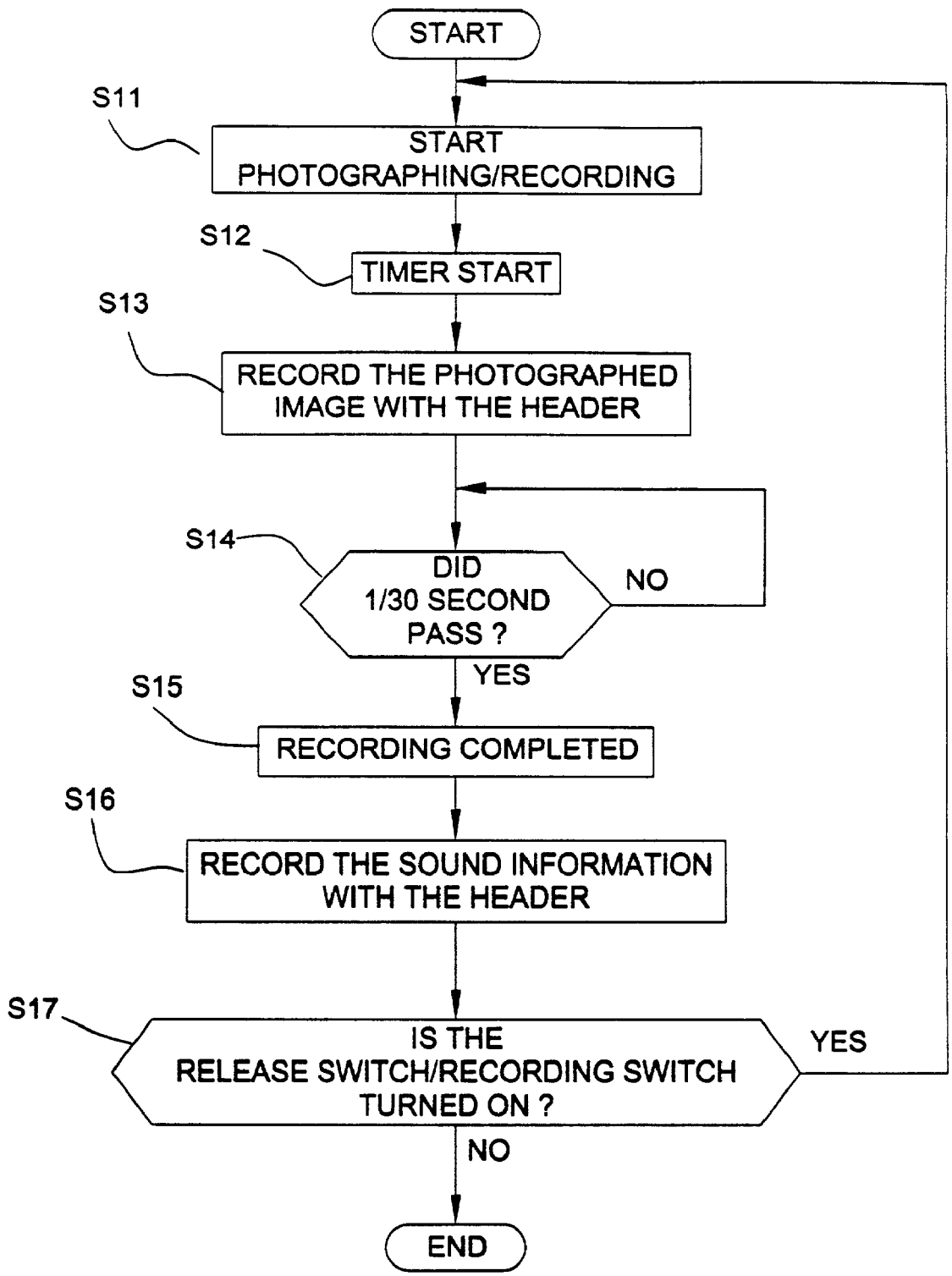

Referring to FIG. 19, the photographing and recording control performed by the CPU 34 when the continuous shooting mode switch 13 is switched to the H mode is explained. The processing that is shown in FIG. 19 starts by simultaneously pressing the release switch 10 and the recording switch 12.

The program which is shown in the flow chart of FIG. 19 is stored in a ROM, which is in the CPU 34, but which is not shown in the figure. Moreover, the program which is shown in the flow chart of FIG. 19 can be supplied to the user in the condition of being stored in the ROM in the CPU 34 or can be supplied to the user in the condition of being stored on a recording medium such as a CD-ROM so that it can be copied the ROM in the CPU 34.

In FIG. 19, photographing and recording commences at step S11.

In step S12, the clock counting is started by the clock circuit, which is stored in the CPU 34, for evaluating time at the later step S4.

In step S13, the header information of date and time and the photographed image are recorded in the photographed image recording area of the memory card 24.

In step S14, it is determined using the clock circuit, whether 1/30 second has elapsed. If 1/30 second has not passed yet, the evaluation will continue. If 1/30 second has passed, processing continues to step S15, and the recording is completed.

In step S16, the sound information is recorded in the sound information recording area of the memory card 24 with the same header information of date and time as the photographed image that was recorded in step S13.

In step S17, it is detected whether the release switch 10 and the recording switch 13 are continuously pressed, and if they are not pressed, the processing will be completed. When the release switch 10 and the recording switch 13 are still pressed, processing returns to step S11.

Figure 9:
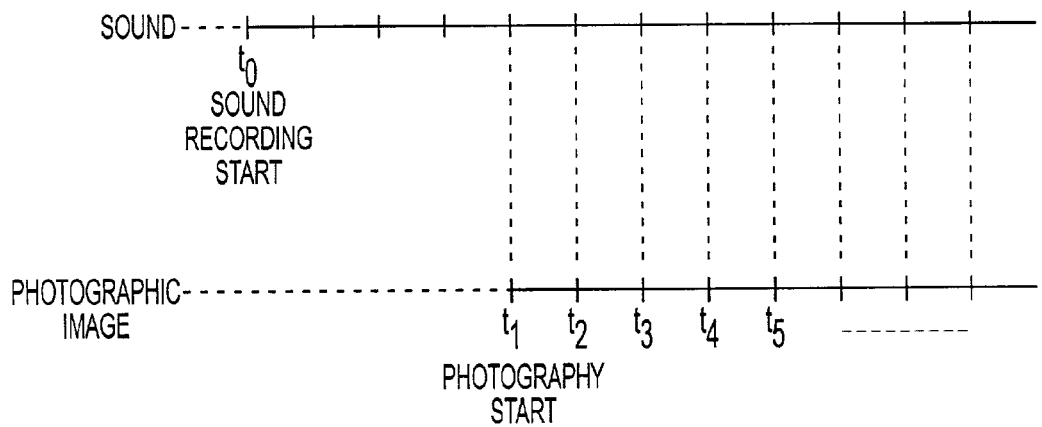
FIG. 9 is a drawing explaining the header information of each type of information when having pressed the sound recording switch 12, and then having pressed the release switch 10.

When the continuous mode switch 13 is switched to L mode or H mode and the record switch 12 is pressed at the start, and thereafter the release switch 10 is pressed, the header information is recorded as shown in FIG. 9 for the information recorded in the memory card 24.

As shown in FIG. 9, the sound data up to when the release switch 10 is pressed is recorded as one file along with the header information of the sound recording start moment $t_0$ in the sound information recording area of the memory card 24. Thereafter, when the release switch 10 is pressed, in the same manner as shown in FIG. 8, the date and time header information corresponding to each frame of the photographic data is recorded along with the sound data.

Figure 10:
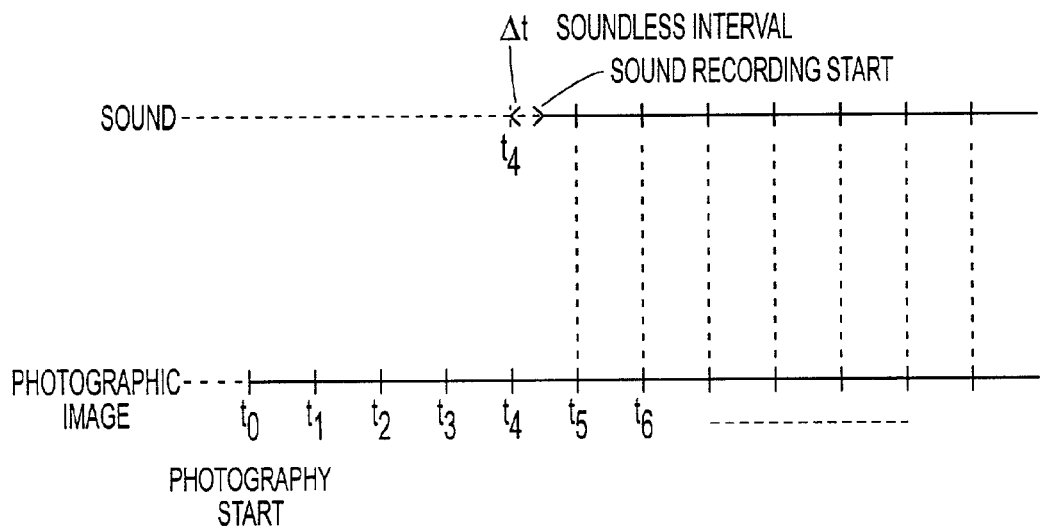
FIG. 10 is a drawing explaining the header information of each type of information when having pressed the release switch 10, and then having pressed the sound recording switch 12.

Furthermore, when the continuous mode switch 13 is switched to L mode or H mode and the release switch 10 is pressed at the start and then the sound recording switch 12 is pressed, the header information is recorded as shown in FIG. 10 for the information recorded on the memory card 24.

As shown in FIG. 10, when photography is started at moment $t_1$, and the sound recording switch 12 is pressed while between the fifth frame and the sixth frame (that is, moment $t_4$ through moment $t_5$), sound data having the header information corresponding to the moment $t_4$ annexed to it is recorded in the sound information recording area of the memory card 24. Following that, the sound data goes on to be recorded in the same manner as the case shown in FIG. 8. Of the sound data having the header information of moment $t_1$ annexed, the interval between moment $t_4$ and the sound recording start moment is a soundless interval $\Delta t$.

By following the above-described process, when deleting an arbitrary photographic image while editing photographic images or sounds after recording, it is possible to delete also the sound information having the header information identical to the header information of that photographic image.

Figure 20:
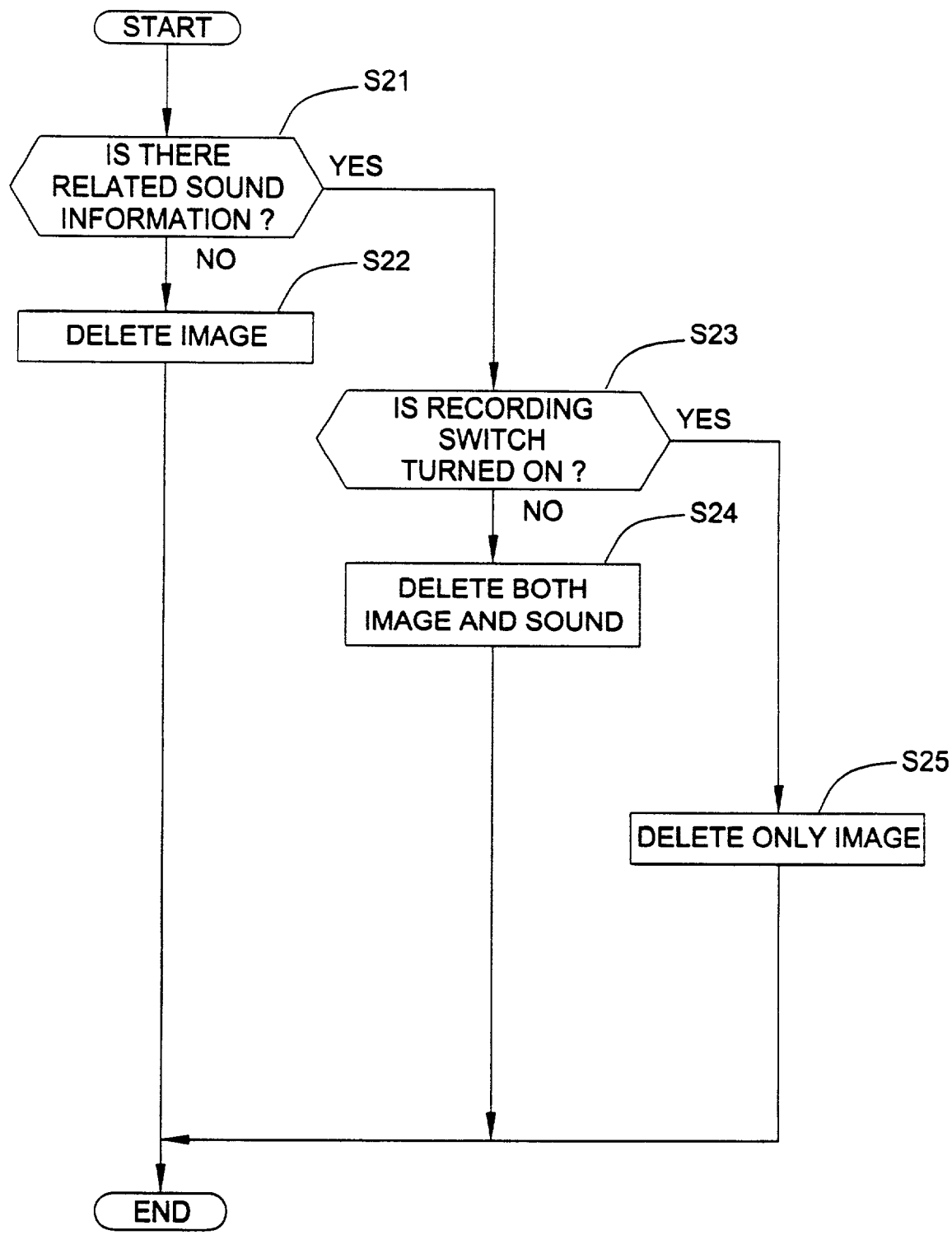

Referring to FIG. 20, the optional delete control of the photographing image by CPU 34 is explained. The processing of the flow chart which is shown in FIG. 20 is started when an arbitrary photographed image is selected by the user, and the delete operation is performed.

The program that is shown in FIG. 20 is stored in the ROM, which is in the CPU 34, but which is not shown in the figure. Moreover, the program shown in the flow chart of FIG. 20 can be supplied to the user in the condition of being stored in the ROM in the CPU 34, or can be supplied to the user in the condition of being stored in a recording medium such as a CD-ROM so that it can be copied to the ROM in the CPU 34.

In step S21, it is detected whether sound information exists that has the same header information as the selected photographed image. If the sound information does not exist, processing continues to step S22, and the photographed image is removed, completing the routine. If the sound information does exist, processing continues to step S23.

In step S23, it is detected whether the recording switch 12 is turned on or not. If the recording switch 12 is turned on, processing continues to step S24, and the photographed image and the sound information that has the same header information as the photographed image are deleted. If the recording switch 12 is not turned on, processing continues to step S25, and only the photographed image information is deleted, completing the routine.

While deleting an arbitrary photographic image, when it is not necessary to delete the sound information having the header information identical to that photographic image, it is possible also to abort the deletion of the sound information by operating a mode switch (not shown).

Figure 11:
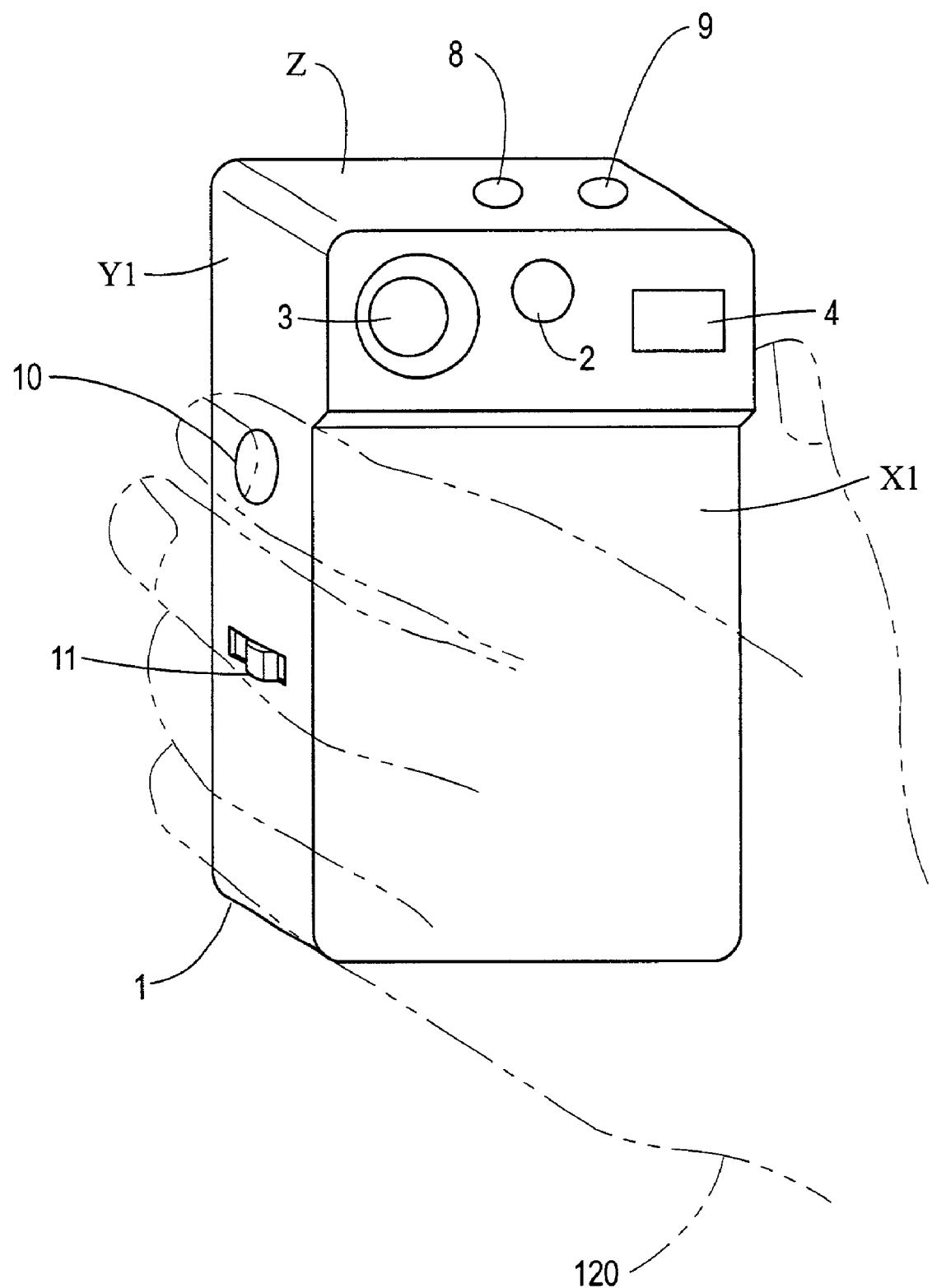
FIG. 11 is a front perspective view showing an embodiment of the information input apparatus as held by the left hand.
Figure 12:
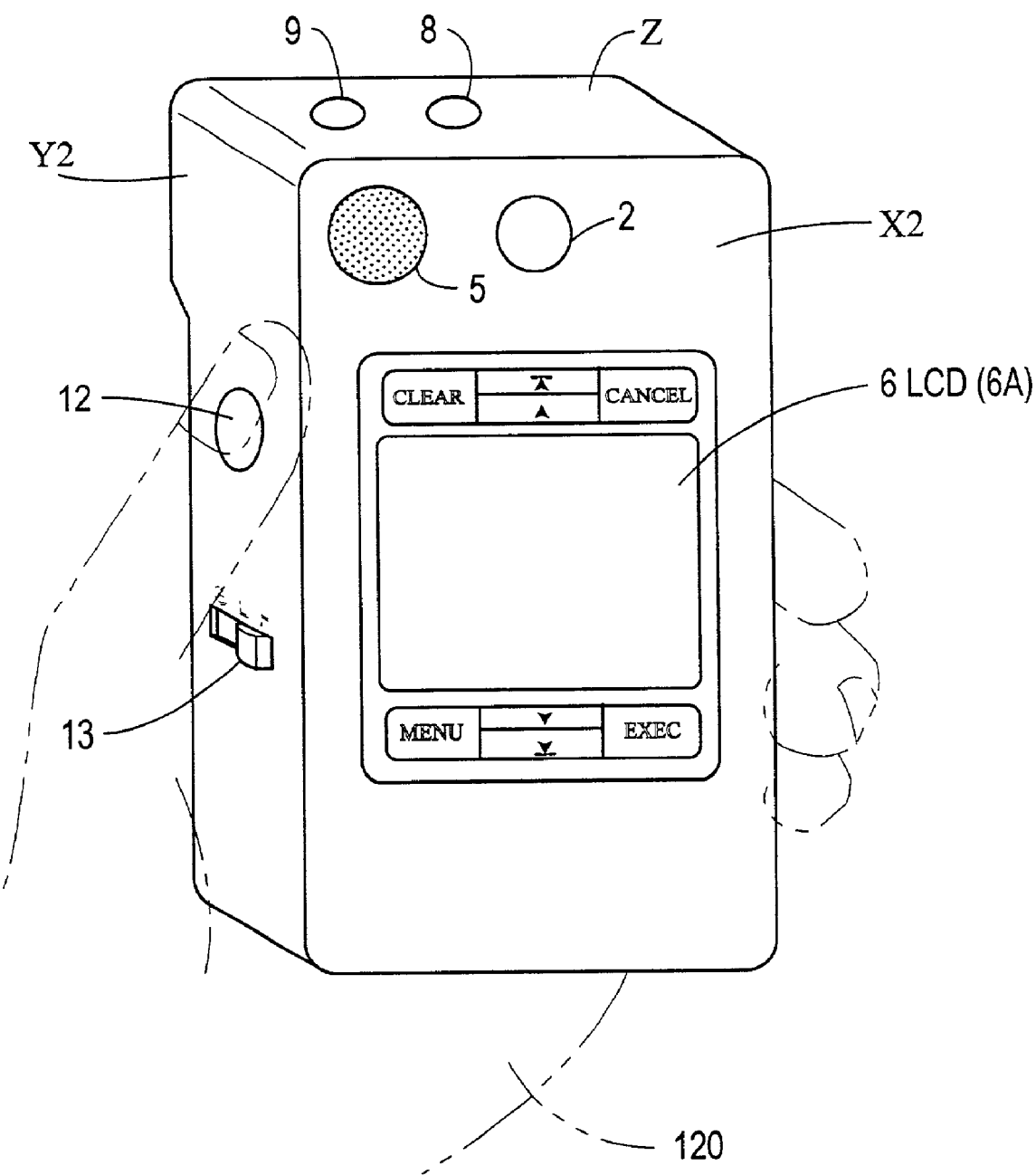
FIG. 12 is a rear perspective view of the embodiment of the information input apparatus of FIG. 11 as held by the left hand.

Next, how to hold the information input apparatus 1 of the present preferred embodiment is explained referring to FIGS. 11 and 12. That is, the information input apparatus 1 of the present preferred embodiment is provided on the upper end with a finder 2, photographic lens 3, and flash component 4, used to image the objects. Also, a microphone 8 that inputs sounds is provided on the top side (side Z) of the main body of the apparatus.

Also, a release switch 10 operated when photographing objects and a sound recording switch 12 operated when inputting sounds are provided on side Y1 and side Y2, respectively, vertically below the finder 2, photographic lens 3, and flash component 4, mentioned above.

Furthermore, on top of side X2 is placed the LCD 6 vertically below the finder 2, and inside the apparatus are provided the batteries 21 and condenser 22, shown in FIG. 3, vertically below the LCD 6.

When holding the pen-type pointing device, not shown, in the right hand and inputting line-drawing information into the LCD 6 (touch tablet 6A), as shown in FIGS. 11 and 12, the user holds securely side X1 (the side opposite the side X2 wherein the LCD 6 is formed) in the palm of the left hand 120.

In this information input apparatus is maintained a sufficient length vertically below the finder 2, photographic lens 3, and flash component 4 (because the batteries 21 and contenser 22 are provided), and the various components 2 through 4 are not covered by the left hand 120 holding the apparatus. Also, in the present preferred embodiment, the index finger of the user's left hand 120 is placed in the position formed by the release switch 10 provided on top of side Y1, and the thumb of the left hand 120 is placed in the position formed by the sound recording switch 12 provided on top of side Y2. Consequently, when inputting line-drawing information in the touch tablet 6A, even when sudden photographic opportunities occur, it is possible to photograph the objects by pressing the release switch 10 with the index finger of the left hand, and it is possible to input sounds by pressing the sound recording switch 12 with the thumb.

Also, because the release switch 10 is provided on the right side as viewed from the side of the user, the user can operate the release switch 10 with the right hand in the same manner as an ordinary camera.

In the information input apparatus 1 of the present preferred embodiment, when the user holds the information input apparatus 1, the release switch 10 and sound recording switch 12 are positioned opposite each other on the left and right sides of the apparatus, and vertically below the photographic lens 3, so that there is no obstruction to the lens when holding the apparatus.

Figure 13:
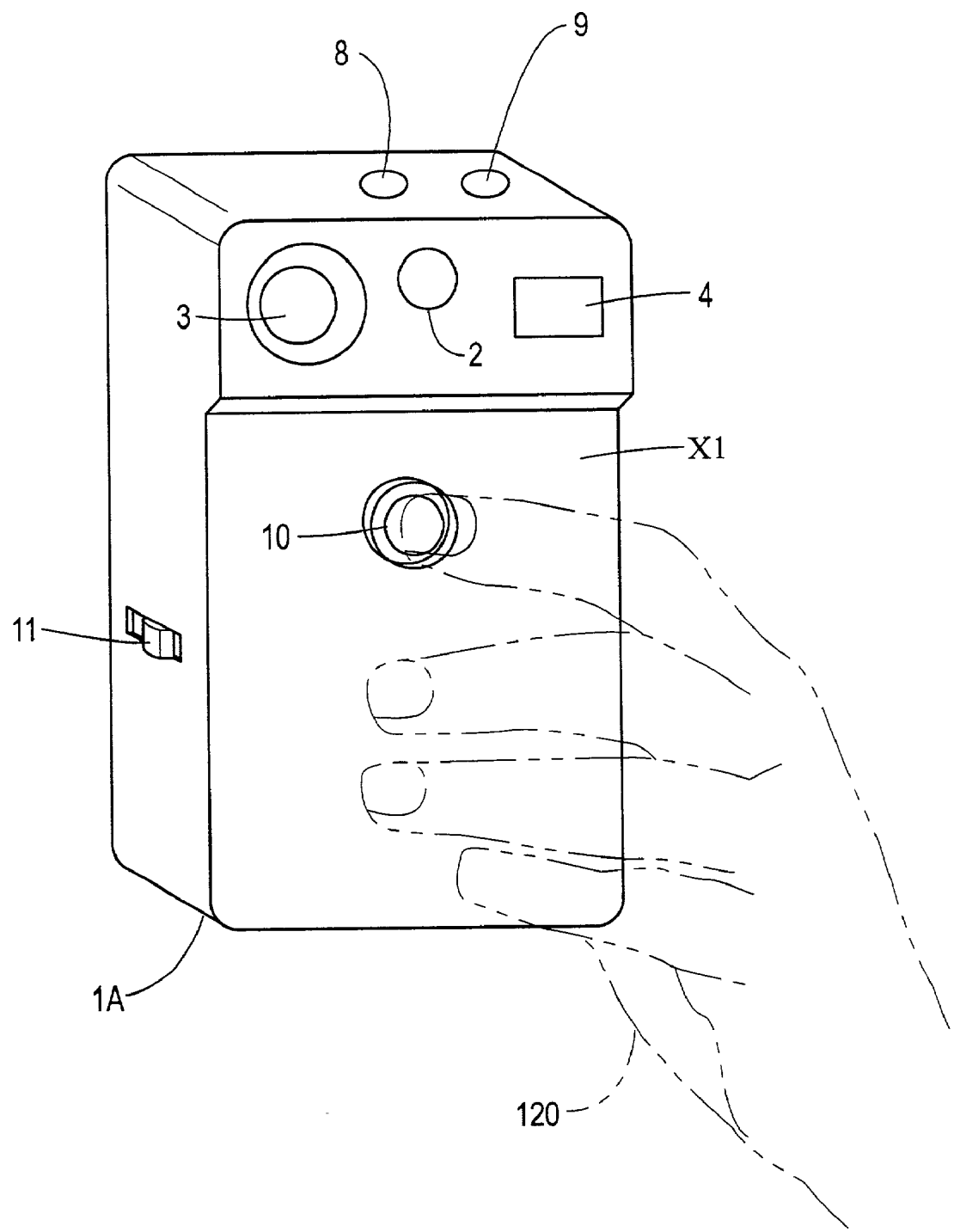
FIG. 13 is a front perspective view showing another embodiment of the information input apparatus as held by the left hand.
Figure 14:
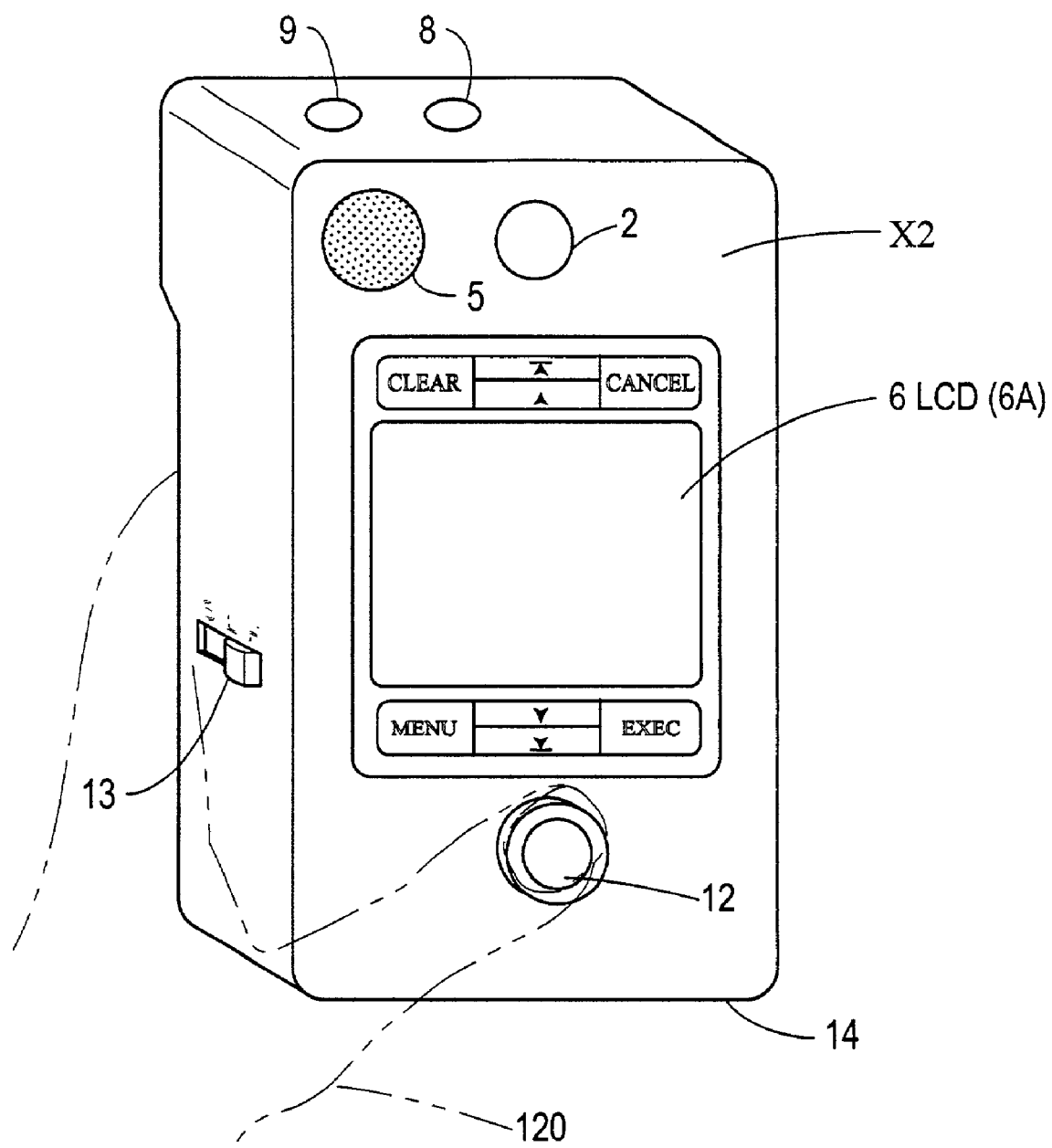
FIG. 14 is a rear perspective view of the embodiment of FIG. 13 as held by the left hand.

Furthermore, in an alternative embodiment, the release switch 10 and sound recording switch 12 can be placed on the side X1 and the side X2, respectively, as shown in FIGS. 13 and 14. In this case as well, each switch 10 and 12 is placed vertically below the finder 2, photographic lens 3, and flash component 4. Even when placed in this manner, the user can hold this information input apparatus 1A securely with the left hand 120 without covering the components 2 through 4 mentioned above, and can operate the sound recording switch 12 with one's thumb and the release switch 10 with one's index finger.

As discussed above, the present invention allows for the recording of identifying header information such as input time and date with photographic image data and sound data. The apparatus of the present invention also makes it possible to record other identifying information besides input time and date, such as for example, search information, by separately compiling the photographic image data and sound data.

The annexing of identical or related header information to a second type of information while a first type of information recorded by the recording means is being reproduced, facilitates the addition of properly synchronized information.

Additionally, in the above-described embodiments, the same header information of the date and time is added to both the photographed image and the sound image that are simultaneously recorded. However, it is not always necessary to have the same date and time header information. Any header information that informs the information input apparatus of the relation between the photographed information and the sound information is acceptable. For example, the header information can be photograph frame number information.

What is claimed is:

1. An information processing apparatus, comprising:
   information receiving means for receiving first and second types of information;
   conversion means for digitizing said first and second types of information;
   detection means for detecting the times said first and second types of information are received by said receiving means;
   annexing means for annexing header information to said first and second types of digitized information, with said header information comprising said times;
   recording means for recording said digitized information with said annexed header information into an electronic memory;
   reproduction means for reproducing said recorded information and
   deleting means for deleting one of said first and second digitized information from said electronic memory when said first and second header informations are the same without deleting the other of said first and second digitized information from said electronic memory.

2. The information processing apparatus according to claim 1, wherein:
   said annexing means includes means for annexing the same header information that is already annexed to said first type of information, during reproduction of said first type of information, to said second type of information while recording said second type of information.

3. The information processing apparatus according to claim 1, wherein:
   said annexing means includes means for replacing header information that is already annexed to said first type of information with the same header information that is annexed to said second type of information.

4. The information processing apparatus according to claim 1, further including:
   a first modification means for modifying a rate of speed at which said information receiving means receives said first type of information; and
   a second modification means for modifying a time interval during which said information receiving means receives said second type of information in proportion to the results of said modifying of said first modification means.

5. The information processing apparatus according to claim 4, wherein:
   said first type of information comprises photographic images and said second type of information comprises sounds and said second modification means modifies said time interval to 1/N seconds when said first modification means has modified said rate of speed to N photographic frames per second.

6. An information processing apparatus, comprising:
   a photographic lens;
   a microphone;
   a photoelectric device, said photoelectric device being connected to said photographic lens for receiving images from said photographic lens and converting said images into electrical signals;
   an analog/digital conversion device, said analog/digital conversion device being connected to said photoelectric device and said microphone for digitizing analog signals received from said photoelectric device and said microphone;
   an electronic memory for recording said digitized signals;
   a microprocessor, said microprocessor being connected to said analog/digital conversion device and having a clock circuit for recording the times when said photoelectric device receives said images and said microphone receives sounds, an annexing means for annexing said times as header information to said digitized signals, reproduction means for retrieving said digitized signals from said electronic memory, and deleting means for deleting one of first and second digitized signals from said electronic memory when first and second header informations associated with the first and second digitized signals are the same without deleting the other of said first and second digitized signals from said electronic memory.

7. The information processing apparatus according to claim 6, further including:
a touch tablet for receiving input information by contact with said touch tablet, said touch tablet being connected to said microprocessor and providing digitized signals corresponding to said contact to said microprocessor.

8. A method of processing information with an information processing device having information receiving means, conversion means for digitizing information received by the information receiving means, an electronic memory, and a microprocessor, said microprocessor having a clock circuit, an annexing means and reproduction means, said method including the steps of:
receiving a first type of information with said information receiving means;
converting said first type of information into first digital signals;
detecting a first time that said first type of information is received by said information receiving means;
annexing said first time as first header information to said first digital signals;
recording said first digital signals with said first header information on said electronic memory;
reproducing said first digital signals while receiving a second type of information with said information receiving means;
converting said second type of information into second digital signals;
detecting a second time that said second type of information is received by said information receiving means;
annexing said second time as second header information to said second digital signals, and replacing said first header information recorded with said first digital signals with said second header information; and
deleting one of said first and second digital signals from said electronic memory when said first and second header informations are the same without deleting the other of said first and second digital signals from said electronic memory.

9. The method of claim 8, wherein:
said step of receiving a first type of information comprises receiving an image through a photographic lens;
said step of converting said first type of information comprises converting said image into first analog electrical signals with a photoelectric device and subsequently converting said first analog electrical signals into first digital signals; and
said step of reproducing said first digital signals while receiving a second type of information comprises reproducing said first digital signals while receiving sounds with a microphone, said microphone converting said sounds into second analog electrical signals.

10. The method of claim 9, wherein:
said first header information is annexed to said first and second digital signals.

11. The method of claim 9, further including:
receiving a third type of information with said information receiving means;
converting said third type of information into third digital signals;
detecting a third time said third type of information is received by said information receiving means;
annexing said third time as third header information to said third digital signals; and
recording said third digital signals with said third header information on said electronic memory.

12. The method of claim 11, wherein:
said step of receiving a third type of information comprises receiving two-dimensional data by contact of a writing instrument with a surface on said information processing device, wherein said surface senses the positions assumed by said writing instrument.

13. An information input apparatus comprising:
input means for inputting a plurality of types of information;
attaching means for attaching a specified header information to information input by said input means;
recording means for recording the information to which said header information is attached;
replay means for replaying information recorded by said recording means; and
control means for ensuring that when new information is input by said input means while information recorded by said recording means is being replayed by said replay means, the header information attached to said information being replayed and header information attached to said new information are one of the same and related header information.

14. A recording medium on which is recorded a control program for controlling an information input device to cause the information input device to:
input a plurality of types of information;
attach specified header information to the input information;
record information to which said header information is attached;
replay the recorded information; and
when new information is input while recorded information is being replayed, the header information attached to said information being replayed is made to be one of the same and related header information to the header information attached to said new information.

15. An information input apparatus comprising:
an input device that inputs a plurality of types of information;
an electronic memory into which the plurality of types of information input with the input device are recorded;
a replay device that replays the information that has been recorded in the electronic memory; and
a controller, the controller being connected to the input device, the output device and the electronic memory, the controller attaching a specified header information to the information that has been input with the input device for recording in the electronic memory, the controller ensuring that when new information is input by the input device while information recorded in the electronic memory is being replayed, header information attached to the information being replayed and header information attached to the new information are one of the same and related header information.

16. A method of processing information with an information input apparatus, the method comprising:
inputting a plurality of types of information into the information input apparatus;
attaching a specified header information to information input into the information input apparatus;
recording the information to which the header information is attached; and
replaying the information that has been recorded;
wherein when new information is input into the information input apparatus while information that has been recorded is being replayed, the header information attached to the information being replayed and header information attached to the new information being input are one of the same and related header information.

17. An information processing apparatus, comprising:

information receiving means for receiving first and second types of information;

conversion means for digitizing said first and second types of information;

detection means for detecting the times said first and second types of information are received by said receiving means;

annexing means for annexing header information to said first and second types of digitized information, with said header information comprising said times;

recording means for recording said digitized information with said annexed header information into an electronic memory;

reproduction means for reproducing said recorded information; and deleting means for deleting said first type of information from said electronic memory with said first type of information having said first time annexed thereto and deleting said second type of information having said second time annexed thereto when said second time is equal to said first time.

18. An information processing apparatus, comprising:

a photographic lens;

a microphone;

a photoelectric device, said photoelectric device being connected to said photographic lens for receiving images from said photographic lens and converting said images into electrical signals;

an analog/digital conversion device, said analog/digital conversion device being connected to said photoelectric device and said microphone for digitizing analog signals received from said photoelectric device and said microphone;

an electronic memory for recording said digitized signals; and a microprocessor, said microprocessor being connected to said analog/digital conversion device and having a clock circuit for recording the times when said photoelectric device receives said images and said microphone receives sounds, an annexing means for annexing said times as header information to said digitized signals, reproduction means for retrieving said digitized signals from said electronic memory, and deleting means for deleting first digitized signals from said electronic memory with said first digitized signals having a first time annexed thereto and deleting second digitized signals having a second time annexed thereto when said second time is equal to said first time.

19. A method of processing information with an information processing device having information receiving means, an electronic memory, and a microprocessor, said microprocessor having a clock circuit, an annexing means and reproduction means, said method including the steps of:

receiving a first type of information with said information receiving means;

converting said first type of information into first digital signals;

detecting a first time that said first type of information is received by said information receiving means;

annexing said first time as first header information to said first digital signals;

recording said first digital signals with said first header information on said electronic memory;

reproducing said first digital signals while receiving a second type of information with said information receiving means;

converting said second type of information into second digital signals;

detecting a second time that said second type of information is received by said information receiving means;

annexing said second time as second header information to said second digital signals, and replacing said first header information recorded with said first digital signals with said second header information; and deleting said first digital signals from said electronic memory with said first digital signals having said first time annexed thereto and deleting said second digital signals having said second time annexed thereto when said second time is equal to said first time.

* * * * *